(12) United States Patent
Jesudason et al.

(10) Patent No.: US 10,197,400 B2
(45) Date of Patent: Feb. 5, 2019

(54) CALIBRATION METHODS AND SYSTEMS FOR AN AUTONOMOUS NAVIGATION VEHICLE

(71) Applicant: Sharp Laboratories of America, Inc., Camas, WA (US)

(72) Inventors: Basil Isaiah Jesudason, Portland, OR (US); Darin Joseph Haines, Washougal, WA (US); Ahmet Mufit Ferman, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 203 days.

(21) Appl. No.: 15/053,869

(22) Filed: Feb. 25, 2016

(65) Prior Publication Data

US 2017/0248426 A1 Aug. 31, 2017

(51) Int. Cl.
*G01C 21/00* (2006.01)
*G01C 21/20* (2006.01)
*G01C 21/30* (2006.01)
*G01C 25/00* (2006.01)

(52) U.S. Cl.
CPC ............. *G01C 21/20* (2013.01); *G01C 21/30* (2013.01); *G01C 25/00* (2013.01)

(58) Field of Classification Search
CPC ......... G01C 21/20; G01C 21/30; G01C 25/00
See application file for complete search history.

(56) References Cited

U.S. PATENT DOCUMENTS

2016/0161602 A1* 6/2016 Prokhorov ............ G01S 7/4972
 702/97
2016/0353099 A1* 12/2016 Thomson ............. H04N 17/002

* cited by examiner

*Primary Examiner* — Adam M Alharbi
(74) *Attorney, Agent, or Firm* — ScienBiziP, P.C.; Alvin Koan

(57) ABSTRACT

Aspects of the present invention relate to systems and methods for calibrating an autonomous navigation system. According to a first aspect of the present invention, calibration of the autonomous navigation system may be controlled by a calibration map.

18 Claims, 23 Drawing Sheets

CALIBRATION METHODS AND SYSTEMS FOR AN AUTONOMOUS NAVIGATION VEHICLE

FIELD OF THE INVENTION

Embodiments of the present invention relate generally to methods and systems for autonomous navigation and, in particular, to methods and systems for calibration of an autonomous navigation vehicle.

BACKGROUND

An absolute positioning system, for example, a Global Navigation Satellite System (GNSS), may be a sensor of choice for outdoor, land-based navigational tasks. Examples of GNSS include GPS (Global Positioning System), GLONASS (Global Navigation Satellite System), Galileo and Beidou. However, obstructions of the signals between the GNSS transmitters and the receiver may result in the loss of GNSS signals by the receiver. Buildings, trees and other similar obstructions may contribute to the loss of such signals for GNSS receivers operating at, or near, ground level.

In order to compensate for time intervals when a signal from an absolute positioning system may be unavailable, many autonomous navigation systems may use gyroscopes, vision-based navigation, LIDAR, odometry and other navigation techniques in addition to the absolute positioning system to provide additional navigational stability. However, drift in a gyroscope and other sensors may result in unbounded growth of errors in the estimation of heading.

Calibration methods and systems for determining gyroscope drift and other sensor drift may be desirable.

SUMMARY

Some embodiments of the present invention comprise methods and systems for calibration of an autonomous navigation vehicle.

According to a first aspect of the present invention, when a first location of an autonomous navigation vehicle corresponds to a location on a calibration map, an overall calibration index value may be retrieved and used to determine if the first location is a suitable location for performing a calibration operation.

According to a second aspect of the present invention, when the first location is determined to be a suitable location for performing a calibration operation, the calibration operation may be performed.

According to a third aspect of the present invention, the overall calibration index value may be indicative of the suitability of the location for performing a calibration operation.

According to a fourth aspect of the present invention, generation of the calibration map may comprise identifying a plurality of calibration-map locations and assigning an overall calibration index value to each calibration-map location.

According to a fifth aspect of the present invention, the overall calibration index value associated with a first calibration-map location may be related to the availability of an absolute positioning system at the first calibration-map location.

According to a sixth aspect of the present invention, the overall calibration index value associated with the first calibration-map location may be related to the availability of an adequate calibration path at the first calibration-map location.

According to a seventh aspect of the present invention, a calibration map may be generated.

According to an eighth aspect of the present invention, generation of the calibration map may comprise identifying a plurality of calibration-map locations and assigning an overall calibration index value to each calibration-map location in the plurality of calibration-map locations.

According to a ninth aspect of the present invention, identifying a first calibration-map location in the plurality of calibration-map locations comprises determining an availability of an absolute position system at a first candidate location.

According to a tenth aspect of the present invention, identifying a first calibration-map location in the plurality of calibration-map locations comprises identifying a suitable calibration path at a candidate location.

According to an eleventh aspect of the present invention, assigning an overall calibration index value to a first calibration-map location comprises combining a plurality of specific calibration index values.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
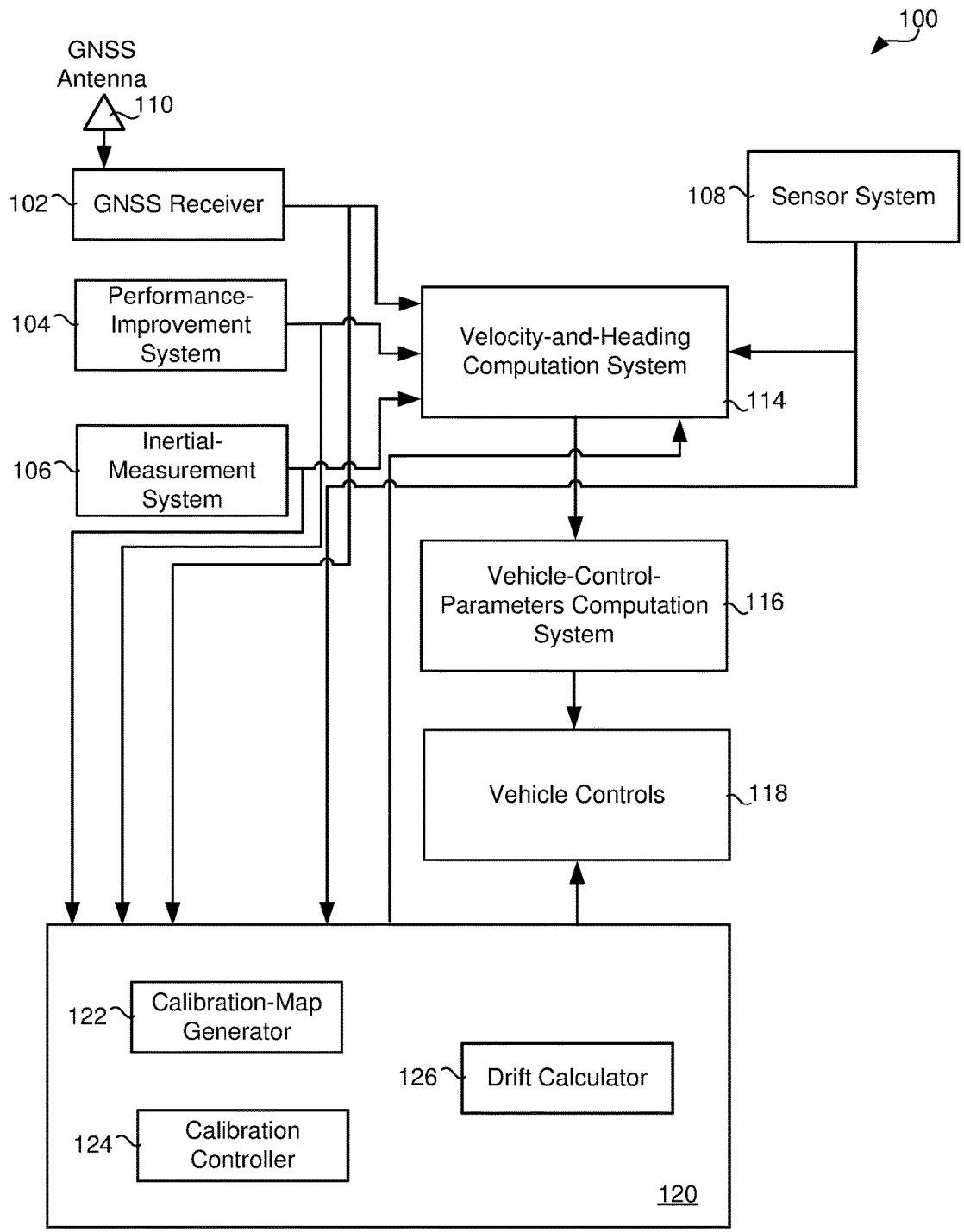
FIG. 1 is a picture illustrating embodiments of the present invention comprising a navigation system comprising a calibration system comprising a calibration-map generator, a calibration controller and a drift calculator.
Figure 2A:
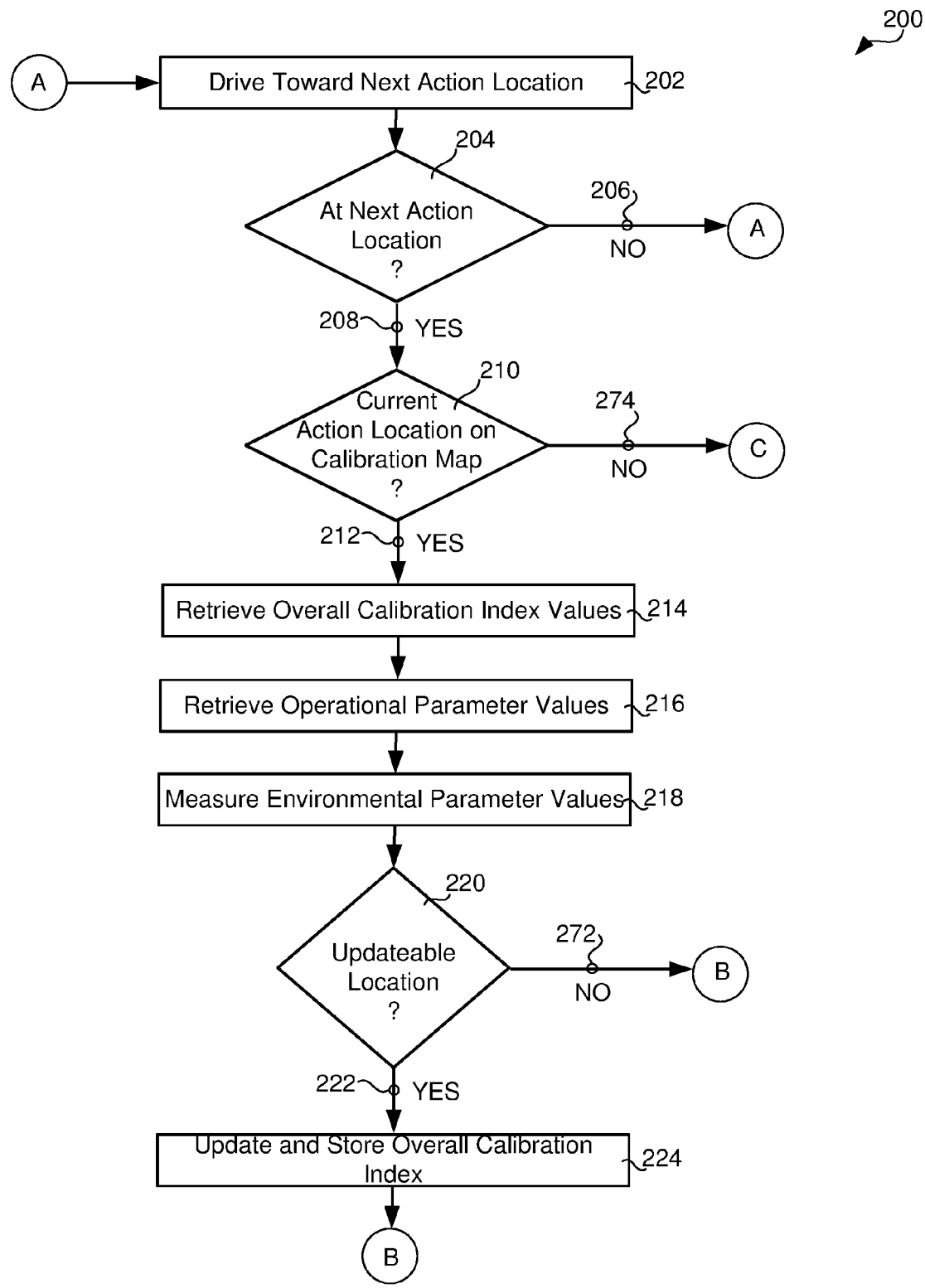
FIGS. 2A-2E are a chart showing exemplary embodiments of the present invention comprising use of a calibration map to determine when to perform a calibration procedure.
Figure 2B:
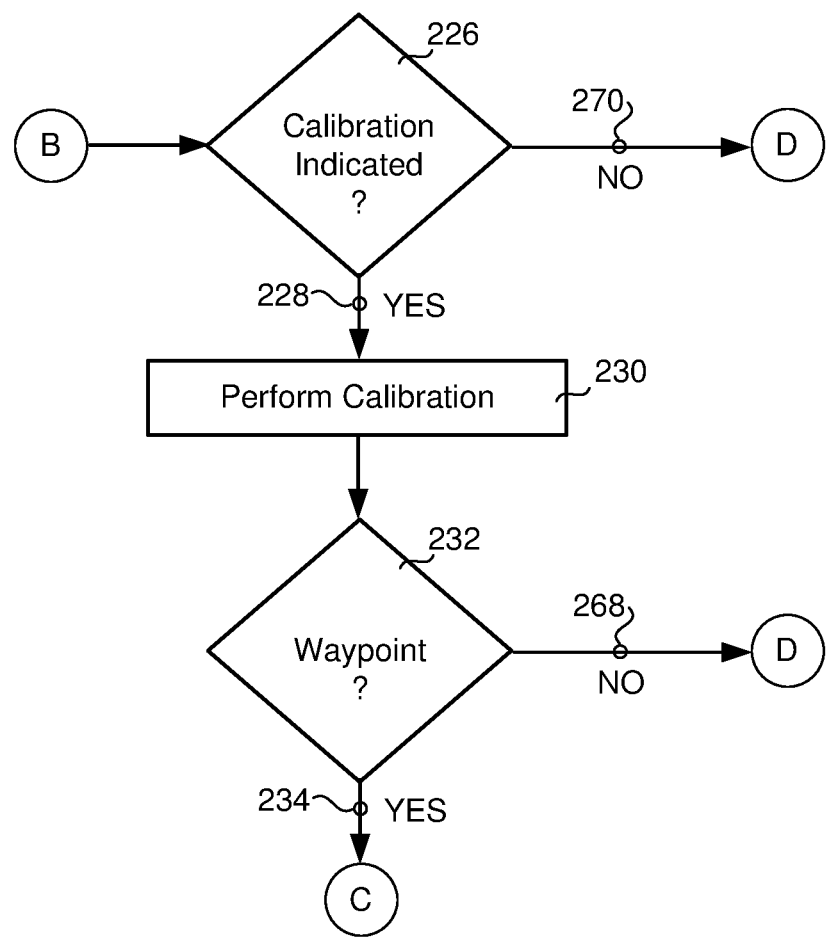
Figure 2C:
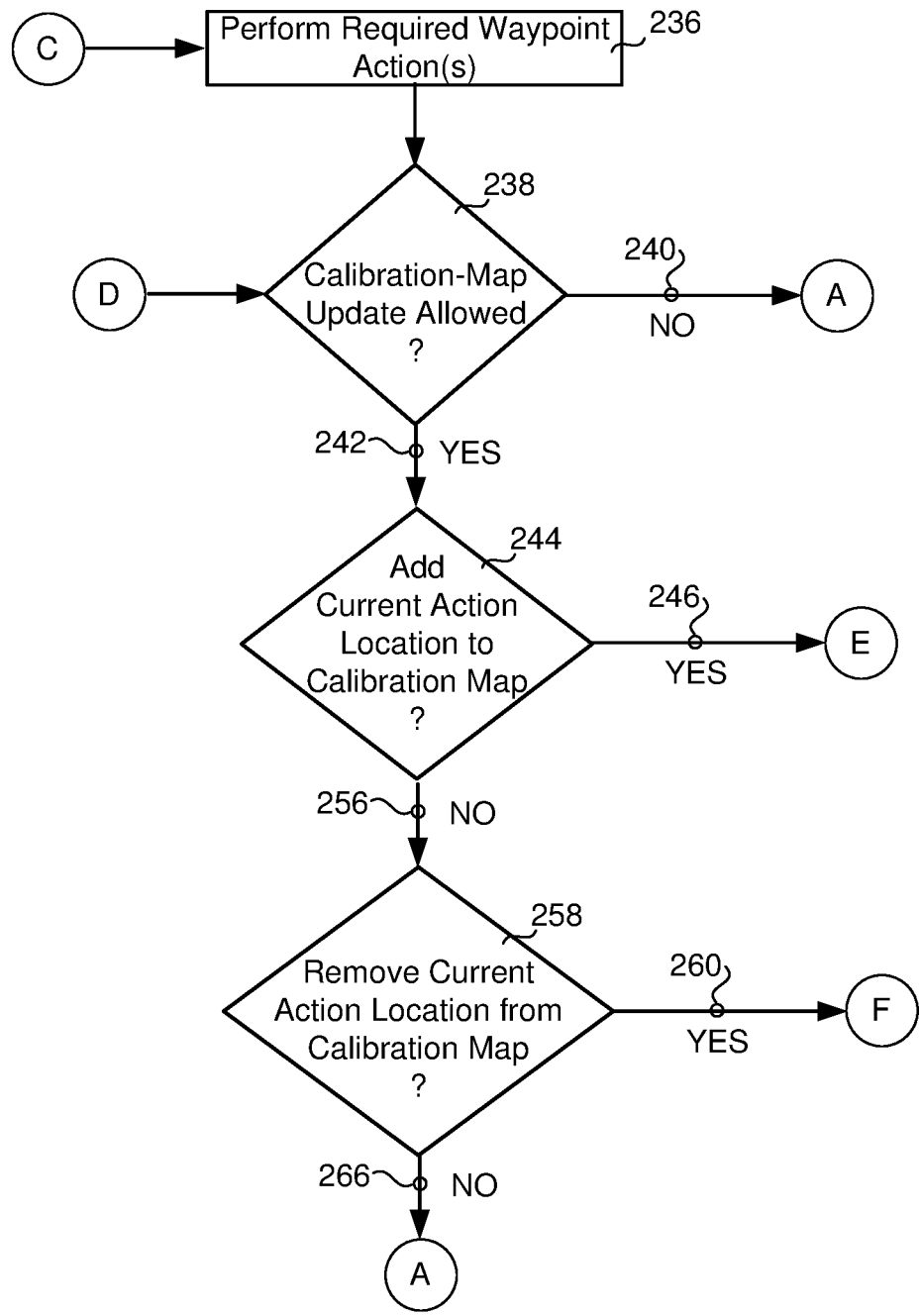
Figure 2D:
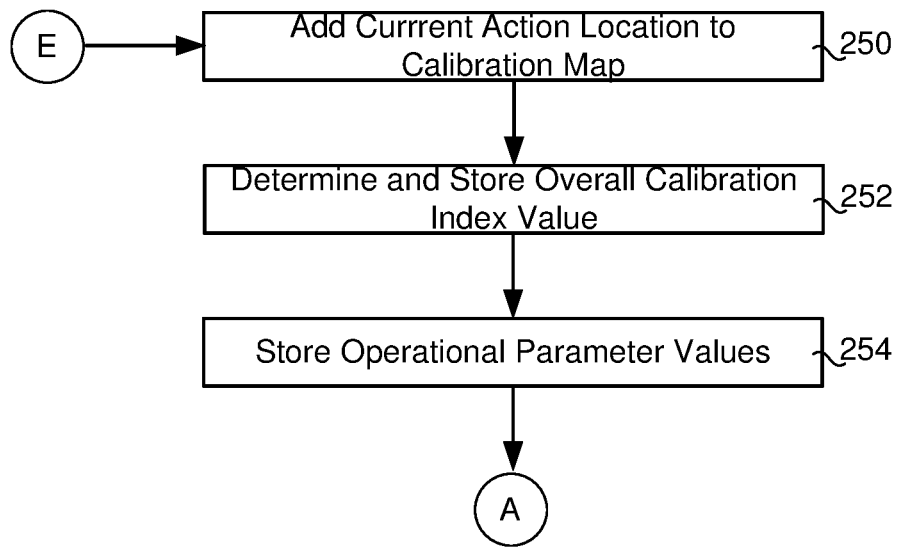
Figure 2E:
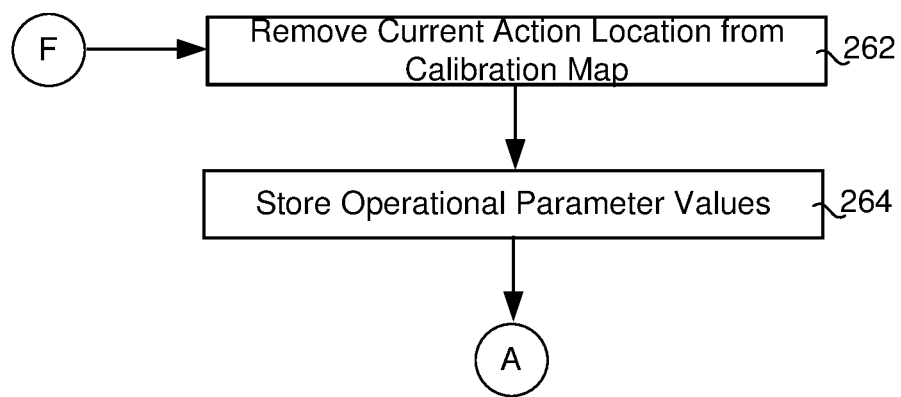

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

An absolute positioning system, for example, a Global Navigation Satellite System (GNSS), may be a sensor of choice for outdoor, land-based navigational tasks. Examples of GNSS include GPS, GLONASS, Galileo and Beidou. However, obstructions of the signals between the GNSS transmitters and the receiver may result in the loss of GNSS signals by the receiver. Buildings, trees and other similar obstructions may contribute to the loss of such signals for GNSS receivers operating at, or near, ground level.

In order to compensate for time intervals when a signal from an absolute positioning system may be unavailable, many autonomous navigation systems may use gyroscopes, vision-based navigation, LIDAR, odometry and other navigation techniques, in addition to the absolute positioning system, to provide additional navigational stability. However, drift in a gyroscope and other sensors may result in unbounded growth of errors in the estimation of heading.

Calibration methods and systems for determining gyroscope drift and other sensor drift may be desirable.

According to exemplary embodiments of the present invention shown in FIG. 1, an autonomous navigation vehicle may comprise a navigation system 100. The navigation system 100 may comprise: a GNSS receiver 102 for receiving signals from a GNSS transmitter; a performance-improvement system 104 for improving the performance of the navigation system 100; an inertial-measurement system 106 for measuring the velocity and orientation of and gravitational forces on the autonomous navigation vehicle; and, optionally, a sensor system 108 comprising one, or more, sensors for providing one, or more, additional inputs. Exemplary GNSS receivers include a GPS receiver, a GLONASS receiver, a Galileo receiver, a Beidou receiver and other global navigation satellite system receivers. Exemplary performance-improvement systems include satellite-based augmentation systems, ground-based augmentation systems, differential GNSS, for example, classical differential GNSS, real-time kinematic (RTK) differential GNSS, wide-area RTK (WRTK) and precise point positioning, and other accuracy-improvement, continuity-improvement and integrity-improvement systems. The inertial-measurement system 106 may comprise one, or more, gyroscopes and one, or more, accelerometers. In some embodiments of the present invention, the inertial-measurement system 106 may comprise a magnetometer. The sensor system 108 may comprise one, or more, sensors, for example, a speed sensor, a distance-measuring laser device, a wheel-slippage sensor, a humidity sensor, a temperature sensor, a camera and other sensors.

The navigation system 100 may also comprise a GNSS antenna 110 for receiving signals. The GNSS receiver 102 may use the signals received by the GNSS antenna 110 to determine the position and the velocity of the autonomous navigation vehicle. The position and the velocity may be provided to a velocity-and-heading computation system 114. The performance-improvement system 104 may provide external information to the velocity-and-heading computation system 114 to improve the integrity, continuity and/or accuracy of the information provided by the GNSS receiver 102. The inertial-measurement system 106 may provide heading reference and attitude information to the velocity-and-heading computation system 114, and the sensor system may provide sensor-specific information to the velocity-and-heading computation system 114.

The velocity-and-heading computation system 114 may compute the current speed, position and attitude of the autonomous navigation vehicle.

The current speed, position and attitude of the autonomous navigation vehicle may be provided to a vehicle-control-parameters computation system 116 which may compute values required to control the autonomous navigation vehicle to maintain, or correct, the vehicle speed and/or heading. The control values may be sent to the appropriate vehicle controls 118, for example, the vehicle steering control, the vehicle braking control, the vehicle throttle control and other vehicle or vehicle accessory controls.

The navigation system 100 may also comprise a calibration system 120 for determining drift due to a gyroscope and other sensors. The calibration system 120 may receive inputs from the GNSS receiver 102, the performance-improvement system 104, the inertial-measurement system 106 and the sensor systems 108. The calibration system 120 may provide control signals to the vehicle controls 118 to control the autonomous navigation vehicle to effectuate a calibration process. The calibration system 120 may provide a drift measurement to the velocity-and-heading computation system 114.

The calibration system 120 may comprise a calibration-map generator 122, a calibration controller 124 and a drift calculator 126.

The calibration-map generator 122 may generate a calibration map. The calibration map may associate at each calibration-map location, in a plurality of calibration-map locations on a navigational path, a value for each of one, or more, calibration characteristics. The one, or more, calibration characteristics may be used during autonomous-vehicle navigation to determine if a calibration procedure should be and reliably can be performed at a calibration-map location.

In some embodiments of the present invention, a path on which an autonomous navigation vehicle is to traverse may be defined by a plurality of drive-to points, also referred to as drive-to locations, waypoints and waypoint locations. In some embodiments of the present invention, the autonomous navigation vehicle may be required to perform an action, for example, take a measurement, wait a predefined period of time or other action, at one, or more, of the waypoints.

In some embodiments of the present invention, a plurality of calibration-map locations on a navigational path may comprise each waypoint on the navigational path. In alternative embodiments, a plurality of calibration-map locations on a navigational path may comprise one waypoint on the navigational path. In yet alternative embodiments, a plurality of calibration-map locations on a navigational path may comprise none of the waypoints.

In some embodiments of the present invention, a plurality of calibration-map locations on a navigational path may be selected by an operator. In alternative embodiments of the present invention, a plurality of calibration-map locations on a navigational path may be automatically selected. In yet alternative embodiments of the present invention, a first location may be selectively removed from a plurality of calibration-map locations on a navigational path and/or a second location on the navigational path, not in the plurality of calibration-map locations on the navigational path, may be selectively added to the plurality of calibration-map locations on the navigational path.

In some embodiments of the present invention, a calibration-map location may be selected and/or determined according to one, or more, of the above-described embodiments.

In some embodiments of the present invention, an operator may select a location, on a navigational path, to add to a plurality of calibration-map locations on the navigational path, during a path training session in which an autonomous navigation vehicle is traversing the navigational path in order to learn a route.

In alternative embodiments, an operator may select a location, on a navigational path, to add to a plurality of calibration-map locations on the navigational path, through a user interface. A map of the navigational path may be displayed, and the operator may interactively, for example, through a drag-and-place operation, through a point-and-click operation or through another operation for marking a location, select a point on the displayed navigational path. The location corresponding to the selected point may be added to the plurality of calibration-map locations on the navigational path.

In alternative embodiments of the present invention, a location on a navigational path may be automatically selected to add to a plurality of calibration-map locations. In some of these embodiments, each waypoint on the navigation path may be automatically selected to add to the plurality of calibration-map locations. In other of these embodiments, a first waypoint may be automatically selected to add to the plurality of calibration-map locations, and a second waypoint may be automatically selected to add to the plurality of calibration-map locations based on a relationship between the first waypoint and the second waypoint. Exemplary relationships may be a distance relationship, a spatial relationship, an expected traversal-time relationship and other spatial and/or temporal relationships.

In alternative embodiments of the present invention, a first calibration-map location in a plurality of calibration-map locations may be selectively removed from the plurality of calibration-map locations based on one, or more, temporally changing characteristic values. Examples of temporally changing characteristics may include environmental characteristics, operational characteristics, calibration characteristics and/or other temporally changing characteristics. At the first calibration-map location, one, or more, measurements may be made of the relevant temporally changing characteristics, and the measured values may be used to determine whether, or not, the first calibration-map location may be removed from the plurality of calibration-map locations. In some embodiments of the present invention, each measurement may be compared to a related threshold value, and when the comparisons meet a first criterion, the first calibration-map location may be removed from the plurality of calibration-map locations. When the comparisons do not meet the first criterion, then the calibration-map location may not be removed from the plurality of calibration-map locations. In alternative embodiments, a rule-based decision may be made based on the measured values.

A second location on a navigational path may be selectively added to a plurality of calibration-map locations based on one, or more, temporally changing characteristic values. Examples of temporally changing characteristics may include environmental characteristics, operational characteristics, calibration characteristics and/or other temporally changing characteristics. At a first waypoint on a navigation path, one, or more, measurements may be made of the relevant temporally changing characteristics, and the measured values may be used to determine whether, or not, the waypoint may be added to the plurality of calibration-map locations. In some embodiments of the present invention, each measurement may be compared to a related threshold value, and when the comparisons meet a second criterion, the waypoint location may be added to the plurality of calibration-map locations. When the comparisons do not meet the second criterion, then the waypoint location may not be added to the plurality of calibration-map locations. In alternative embodiments, a rule-based decision may be made based on the measured values.

In some embodiments of the present invention, each waypoint may be examined to be selectively added to the plurality of calibration-map locations. In alternative embodiments, a predetermined waypoint may be examined to be selectively added to the plurality of calibration-map locations.

Exemplary environmental characteristics may be terrain characteristics, meteorological characteristics, for example, temperature, humidity, precipitation, barometric pressure, cloud cover, visibility and other meteorological characteristics and other environmental characteristics.

Exemplary operational characteristics may be power consumption, remaining battery power, autonomous vehicle stability and other operational characteristics.

One exemplary calibration characteristic may be a calibration-suitability characteristic. A calibration-suitability index associated with a calibration-map location may indicate whether, or not, or to what degree, the associated calibration-map location is a suitable location at which to perform a calibration routine.

In some embodiments of the present invention, a calibration-suitability index may be a binary indicator. In alternative embodiments of the present invention, a calibration-suitability index value may be a non-binary value indicative of a degree of suitability of a calibration-map location for performing a calibration routine.

In some embodiments of the present invention, a calibration-suitability index value may be assigned, to a calibration-map location, by an operator. In some embodiments, the operator may assign a calibration-suitability index value to a calibration-map location during a route training session in which the autonomous navigation vehicle is traversing the navigational path in order to learn the route. In these exemplary embodiments, an operator may stop the autonomous navigation vehicle at a location, and if the location is a waypoint, the operator may associate the location with a waypoint and may enter a calibration-suitability index value thereby identifying the location as a calibration-map location. If the location is not a waypoint, the operator may enter a calibration-suitability index value without associating the location with a waypoint. In alternative embodiments, the operator may assign a calibration-suitability index value to a calibration-map location through a user interface.

In some embodiments of the present invention, an operator may be queried at a prospective location to enter a response to one, or more, questions related to location suitability. The operator's answers may be used to determine a calibration-suitability index value related to the prospective location. If the determined calibration-suitability index value meets a suitability criterion, then the prospective location may be added to a plurality of calibration-map locations and the newly added calibration-map location may be assigned the determined calibration-suitability index value.

In alternative embodiments of the present invention, a calibration-suitability index value may be assigned automatically to a calibration-map location.

The availability of GNSS signals at a navigational-path location may be a primary indicator of the suitability of a location for performing a calibration routine. If the required GNSS signals are not available, then the calibration-suitability index may be set to a value indicating that calibration may not be performed at the location. If the required GNSS signals are available under limited circumstances and the calibration-suitability index value may be other than a binary indicator, then the calibration index value may be set to a value indicative of the degree of availability of the GNSS signals at the location.

An operator may not be able to reasonably determine the availability of a GNSS signal at the location, and, in some embodiments of the present invention, an operation to measure the availability of the GNSS signals may be invoked by the calibration-map generator 122 to assist the operator in the assignment of a calibration-suitability index value at the location. In some embodiments of the present invention, the availability of the GNSS signals at a location may be determined automatically by measuring the signal strength or measuring another measure of the availability of the GNSS signals.

In some embodiments of the present invention comprising a camera, image analysis techniques may be used to identify obstructions that impair the reliability of the GNSS signals a location.

In some embodiments of the present invention, calibration of the autonomous navigation vehicle may comprise driving the autonomous navigation vehicle in a straight line for a predetermined time and/or distance and comparing the onboard calculated heading and velocity with the heading and velocity determined using the GNSS signals in order to compute gyroscope drift. Therefore, the availability of a clear, flat path in proximity to a calibration-map location may contribute to the determination of a calibration-suitability index value. In some embodiments of the present invention, an operator may determine the availability of an appropriate calibration path in proximity to a calibration-map location. In alternative embodiments of the present invention comprising a camera, image analysis techniques may be used to determine the availability of an appropriate calibration path in proximity to the calibration-map location.

In some embodiments of the present invention, a calibration-reliability index may be related to environmental conditions, for example, weather conditions and other environmental conditions. In some of these embodiments, a calibration-reliability index may comprise a component that may not be fixed, but that may depend on environmental conditions at an operational time of the autonomous navigation vehicle. For example, if one, or more, sensors indicate that a potential calibration path, at a calibration-map location, is likely or measurably compromised, for example, muddy, frozen or otherwise comprised, the calibration-reliability index may be updated and flagged as updated due to temporary conditions. Upon subsequent traversal of the route, when conditions return to a stable state wherein the calibration path is dependable, then the calibration-reliability index may be updated to indicate such and may be un-flagged.

In some embodiments of the present invention, one, or more, specific calibration index values, for example, a calibration-suitability index value, a calibration-reliability index value and other specific calibration index values, may be combined to form an overall calibration index value. In some embodiments of the present invention, the overall calibration index value may be a weighted combination of the one, or more, specific calibration index values. In alternative embodiments of the present invention, the overall calibration index value may be a rule-based combination of the one, or more, specific calibration index values.

In alternative embodiments of the present invention, an overall calibration index value may be multi-valued and may comprise a plurality of specific calibration index values, for example, a calibration-suitability index value, a calibration-reliability index value and other specific calibration index values.

In some embodiments of the present invention, an overall calibration index value may be assigned automatically at a calibration-map location. In some embodiments of the present invention, during a path training session in which the autonomous navigation vehicle is traversing the navigational path in order to learn the route, when a calibration-map location is reached, the overall calibration index value may be determined automatically.

In alternative embodiments, the operator may select a calibration-map location, on the navigational path, through a user interface and may manually assign an overall calibration index value. A map of the navigational path may be displayed with calibration-map locations highlighted, and an operator may interactively, for example, through a point-and-click operation or through another operation for marking a location, select a calibration-map point on the displayed navigational path. The user may assign an overall calibration index value to the selected calibration-map point. In some of these embodiments, assignment of an overall calibration index value may comprise an assignment of a plurality of specific calibration index values. In some of these embodiments, a user may assign a value to each specific calibration index and further select a rule or method for combining the specific calibration index values. In alternative embodiments, a user may assign a value to each specific calibration index and indicate that an overall calibration index value may be determined automatically. In still alternative embodiments, a user may assign a value to each specific calibration index and indicate that an overall calibration index value is to comprise the multiple individual specific values.

In other alternative embodiments of the present invention, an overall calibration index value may be assigned using a combination of operator determined index values and automatically determined index values.

When an autonomous navigation vehicle is traversing a navigation route, the calibration controller 124 may use the calibration map to determine if a calibration operation should be performed at a calibration-map location. The calibration controller 124 may use a combination of the corresponding calibration index value(s) and other operational parameter values, for example, the elapsed time since a most recent calibration, a temporal history of previous calibration measurements and other operational parameter values.

In some embodiments of the present invention, if a substantive time has elapsed since a previous calibration and the calibration index value at the current calibration-map location is sufficiently indicative of a suitable location for calibrating, then the calibration controller 124 may initiate a calibration operation. The calibration system 120 may send appropriate vehicle control signals to the vehicle controls 118 to commence movement of the autonomous navigation along an associated calibration path. The drift calculator 126 may calculate the gyroscope drift from the resulting inertial measurement system 106, performance improvement system 104 and GNSS receiver 102 measurements. The calculated gyroscope drift may be communicated from the calibration system 120 to the velocity-and-heading computation system 114 in order to compensate future velocity and heading computations for the gyroscope drift.

Some embodiments of the present invention comprising a method 200 for autonomous navigation calibration may be understood in relation to FIG. 2. According to some embodiments of the present invention, an autonomous navigation vehicle may drive 202 toward a next action location, wherein the next action location is a waypoint location, a calibration-map location or a co-located waypoint/calibration-map location. A determination may be made 204 to whether or not the autonomous navigation vehicle has reached the next action location.

If the autonomous navigation vehicle has not 206 reached the next action location, then the autonomous navigation vehicle may continue to drive 202 toward the next action location.

If the autonomous navigation vehicle has 208 reached the next action location, now referred to as the current action location, then a determination may be made 210 to whether or not the current action location is on a calibration map. If the current action location is 212 on the calibration map, then an overall calibration index value may be retrieved 214, one, or more, operational parameter values may be retrieved 216 and one, or more, environmental parameter values may be measured 218.

A determination may be made 220 to whether or not the current action location is a calibration-map location whereat the overall calibration index value may be updated. If the current action location is 222 a calibration-map location whereat the overall calibration index value may be updated, then the overall calibration index value may be updated and stored 224.

A determination may then be made 226 to whether or not calibration is indicated 226. In some embodiments, calibration may be indicated when the overall calibration index value meets a first criteria. In alternative embodiments, calibration may be indicated when the overall calibration index value, the values of the operational parameters and the values of the environmental parameters meet an associated criteria. If calibration is 228 indicated, then a calibration procedure may be performed 230. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

A determination may be then made 232 to whether or not the current action location is also a waypoint location. If the current action location is 234 a waypoint location, then any actions required to be performed at the waypoint may be performed 236. If the autonomous navigation vehicle remains at the terminal point of the calibration path after performing calibration, then, in order to perform any waypoint actions, the autonomous navigation vehicle may first return to the current action location. Then a determination may be made 238 to whether or not calibration-map location updates are allowed. If calibration-map location updates are not 240 allowed, then the autonomous navigation vehicle may drive 202 toward a next action location.

If a calibration-map location update is 242 allowed, then a determination may be made 244 to whether or not the current action location meets a first condition indicating that the current action location should be added to the calibration map. If the current action location meets the first condition 246, then the current action location may be added 250 to the calibration map, an overall calibration index value associated with the current action location may be determined and stored 252, and the current operational parameter values may be stored 254. The autonomous navigation vehicle may drive 202 toward a next action location.

If the current action location does not 256 meet the first condition, then a determination may be made 258 to whether or not the current action location meets a second condition indicating that the current action location should be removed from the calibration map. If the second condition is 260 met, then the current action location may be removed 262 from the calibration map and the current operational parameter values may be stored 264. The autonomous navigation vehicle may drive 202 toward a next action location.

If the second condition is not 266 met, then the autonomous navigation vehicle may drive 202 toward a next action location.

If the current action location is not 268 a waypoint location, then the determination may be made 238 to whether or not calibration-map updates are allowed, and the process may proceed as described above.

If calibration is not 270 indicated, then the determination 238 may be made to whether or not calibration-map location updates are allowed and the process may proceed as described above.

If the current action location is a calibration-map location whereat the overall calibration index value may not 272 be updated, then the determination 226 to whether or not calibration is indicated may be made, and the process may proceed as described above.

If the current action location is not 274 on the calibration map, then any actions required to be performed at the waypoint may be performed 236, and the process may proceed as described above.

Figure 3A:
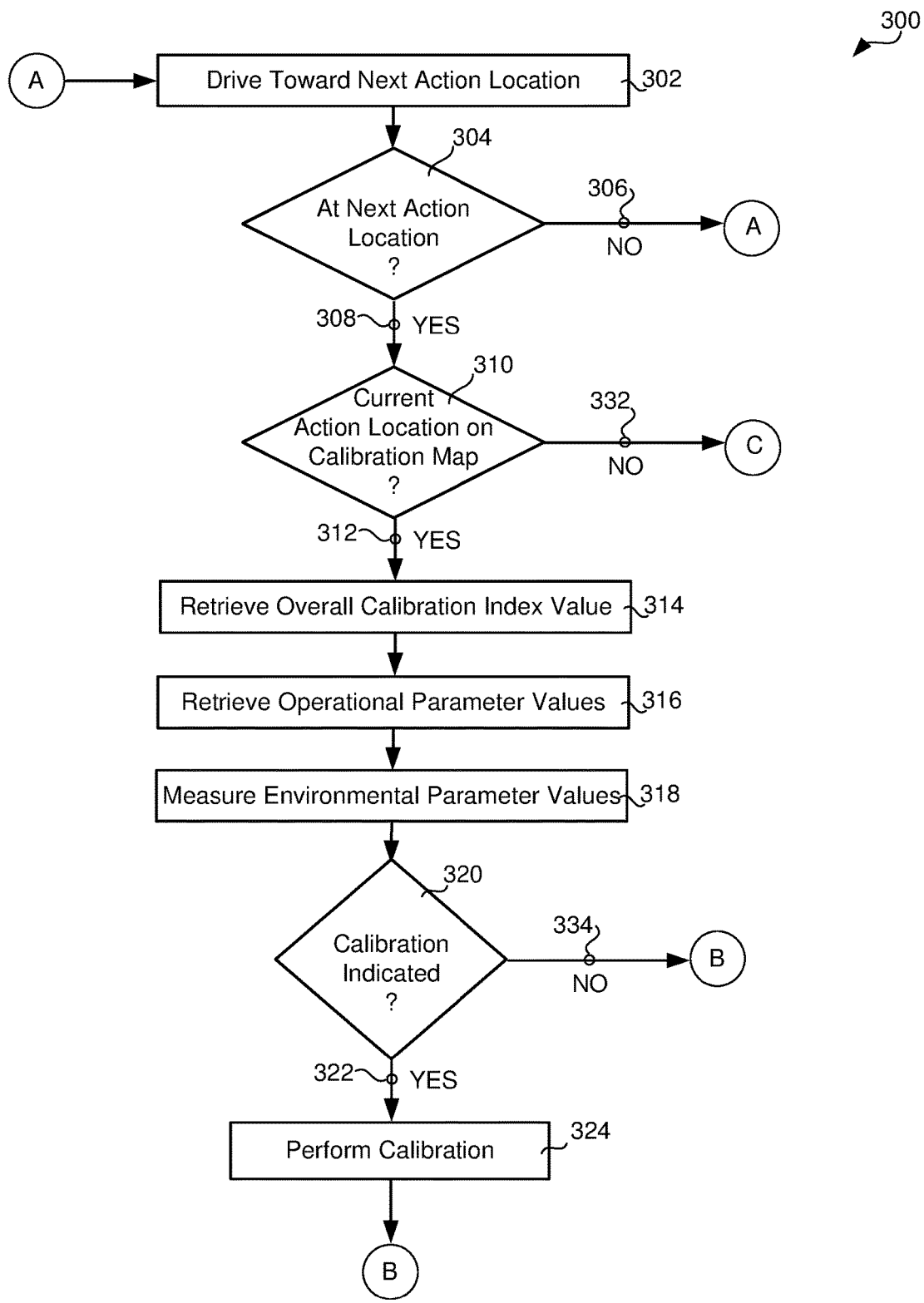
FIGS. 3A-3B are a chart showing exemplary embodiments of the present invention comprising use of a calibration map to determine when to perform a calibration procedure.
Figure 3B:
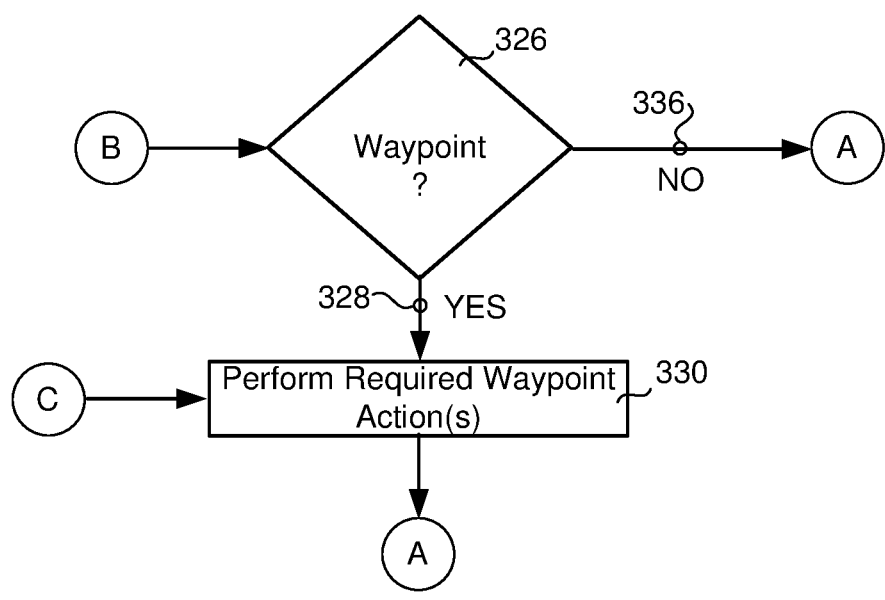

Some embodiments of the present invention comprising a method 300 for autonomous navigation calibration may be understood in relation to FIG. 3. According to some embodiments of the present invention, an autonomous navigation vehicle may drive 302 toward a next action location, wherein the next action location is a waypoint location, a calibration-map location or a co-located waypoint/calibration-map location. A determination may be made 304 to whether or not the autonomous navigation vehicle has reached the next action location.

If the autonomous navigation vehicle has not 306 reached the next action location, then the autonomous navigation vehicle may continue to drive 302 toward the next action location.

If the autonomous navigation vehicle has 308 reached the next action location, now referred to as the current action location, then a determination may be made 310 to whether or not the current action location is on a calibration map. If the current action location is 312 on the calibration map, then an overall calibration index value may be retrieved 314, one, or more, operational parameter values may be retrieved 316 and one, or more, environmental parameter values may be measured 318.

A determination may then be made 320 to whether or not calibration is indicated. If calibration is 322 indicated, then a calibration procedure may be performed 324. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

A determination may be then made 326 to whether or not the current action location is also a waypoint location. If the current action location is 328 a waypoint location, then any actions required to be performed at the waypoint may be performed 330. If the autonomous navigation vehicle remains at the terminal point of the calibration path after performing calibration, then, in order to perform any waypoint actions, the autonomous navigation vehicle may first return to the current action location. The autonomous navigation vehicle may drive 302 toward the next action location.

If the current action location is not 332 on the calibration map, then any actions required to be performed at the waypoint may be performed 330, and the autonomous navigation vehicle may drive 302 toward the next action location.

If calibration is not indicated 334, then the determination may be made 326 to whether or not the current action location is a waypoint.

If the current action location is not 336 a waypoint, then the autonomous navigation vehicle may drive 302 toward a next action location. If the current action location is a waypoint 328, then any actions required to be performed at the waypoint may be performed 330, and the autonomous navigation vehicle may drive 302 toward the next action location.

Figure 4A:
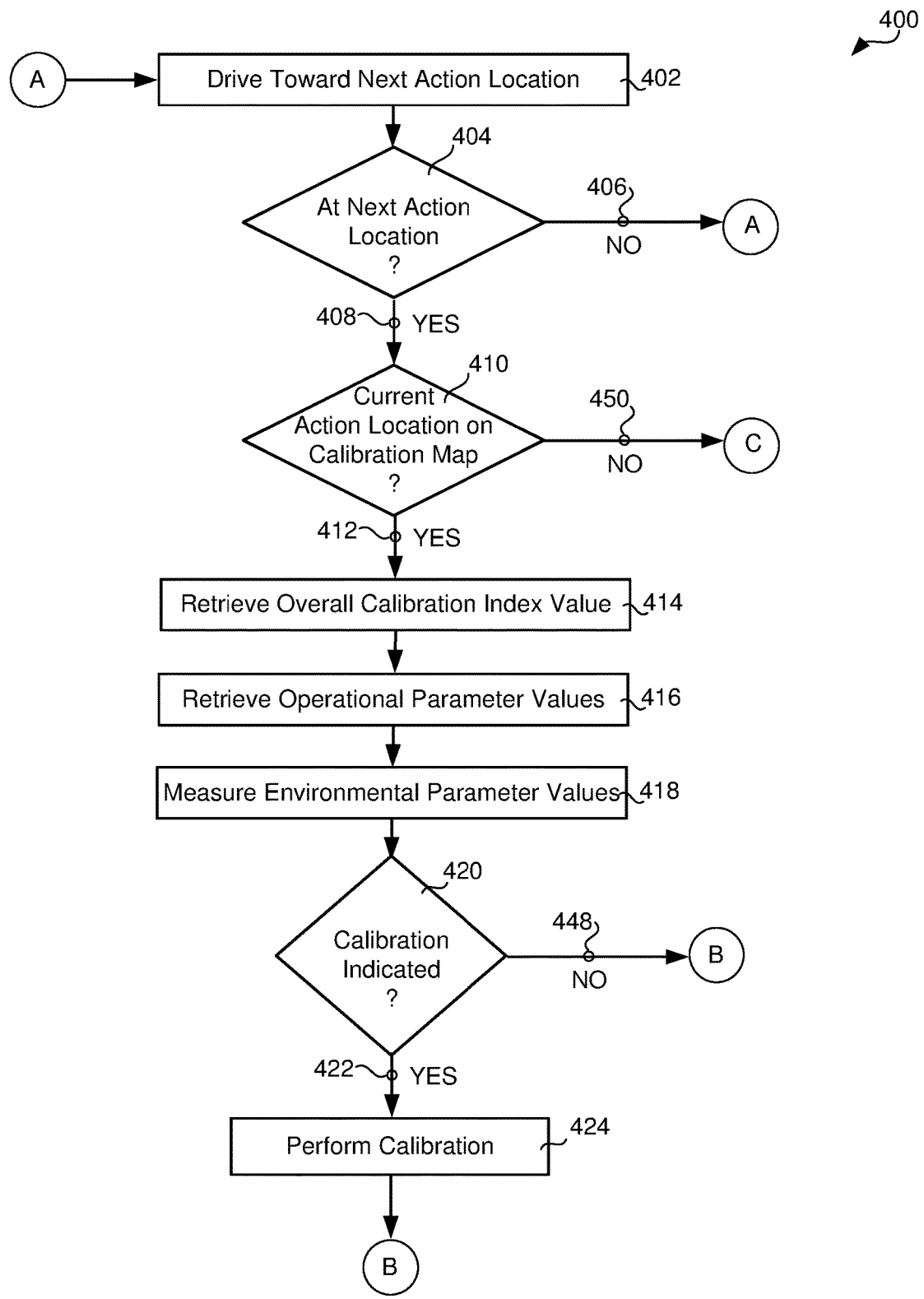
FIGS. 4A-4C are a chart showing exemplary embodiments of the present invention comprising use of a calibration map to determine when to perform a calibration procedure.
Figure 4B:
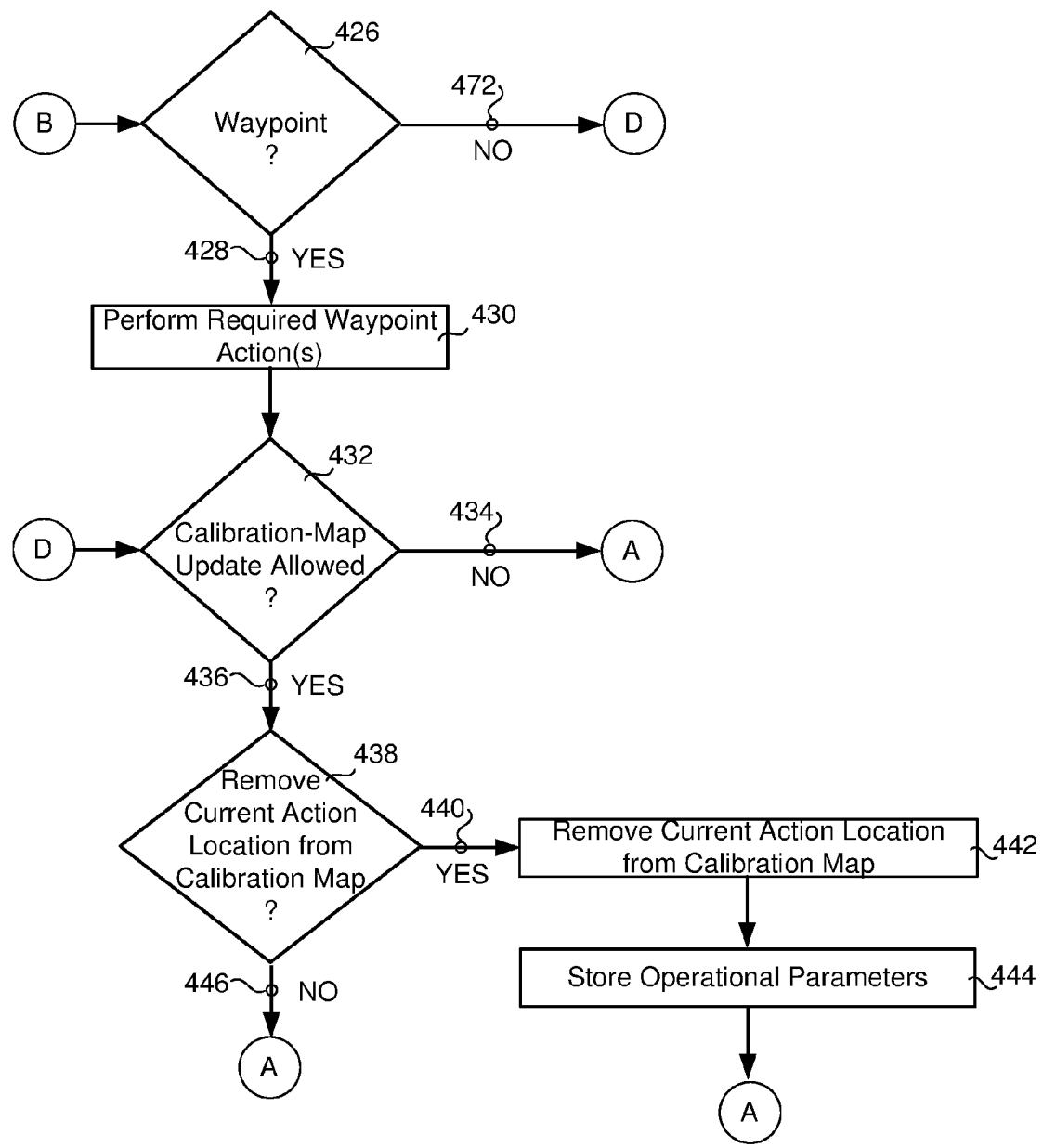
Figure 4C:
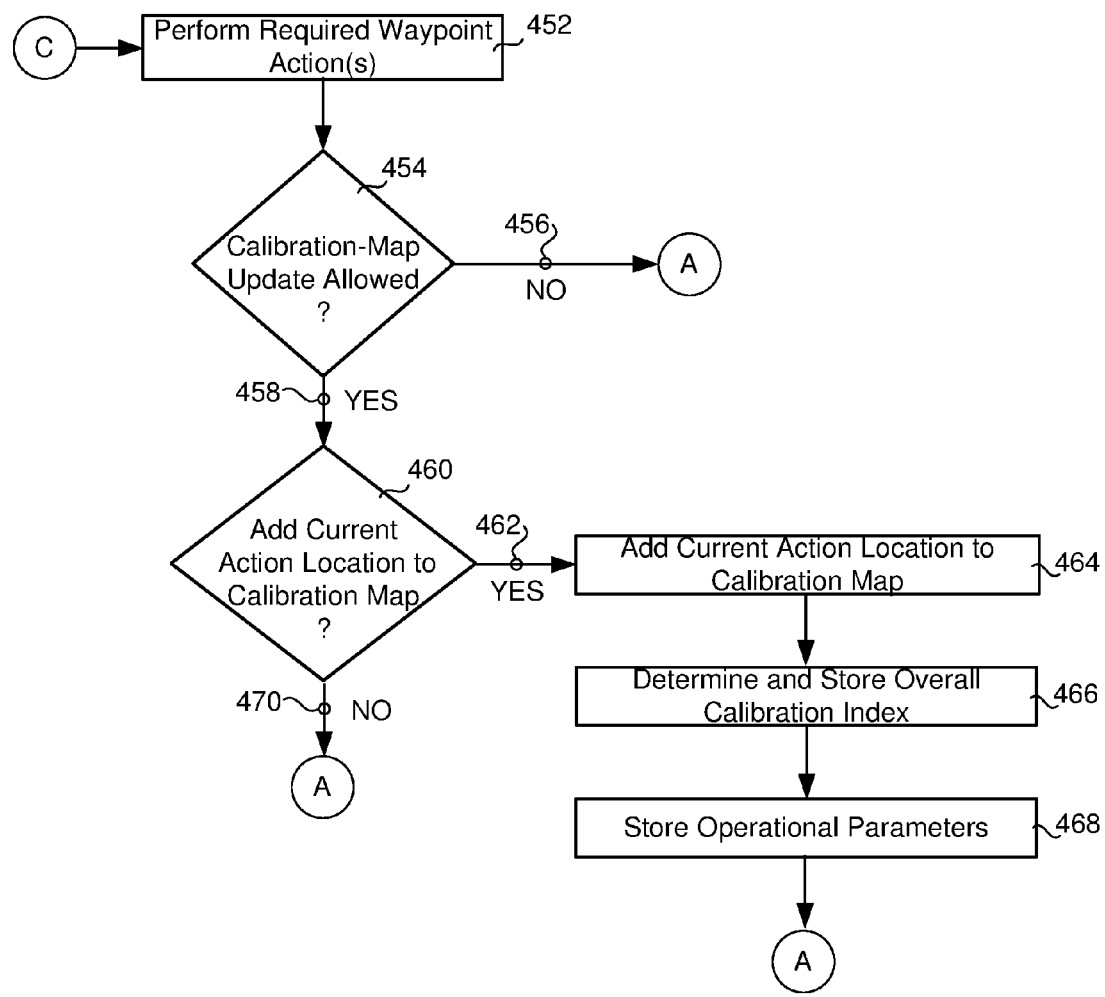

Some embodiments of the present invention comprising a method 400 for autonomous navigation calibration may be understood in relation to FIG. 4. According to some embodiments of the present invention, an autonomous navigation vehicle may drive 402 toward a next action location, wherein the next action location is a waypoint location, a calibration-map location or a co-located waypoint/calibration-map location. A determination may be made 404 to whether or not the autonomous navigation vehicle has reached the next action location.

If the autonomous navigation vehicle has not 406 reached the next action location, then the autonomous navigation vehicle may continue to drive 402 toward the next action location.

If the autonomous navigation vehicle has 408 reached the next action location, now referred to as the current action location, then a determination may be made 410 to whether or not the current action location is on a calibration map. If the current action location is 412 on the calibration map, then an overall calibration index value may be retrieved 414, one, or more, operational parameter values may be retrieved 416 and one, or more, environmental parameter values may be measured 418.

A determination may then be made 420 to whether or not calibration is indicated. If calibration is 422 indicated, then a calibration procedure may be performed 424. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

A determination may be then made 426 to whether or not the current action location is also a waypoint location. If the current action location is 428 a waypoint location, then any actions required to be performed at the waypoint may be performed 430. If the autonomous navigation vehicle remains at the terminal point of the calibration path after performing calibration, then, in order to perform any waypoint actions, the autonomous navigation vehicle may first return to the current action location.

Then a determination may be made 432 to whether or not calibration-map location updates are allowed. If calibration-map location updates are not 434 allowed, then the autonomous navigation vehicle may drive 402 toward a next action location.

If a calibration-map location update is 436 allowed, then a determination may be made 438 to whether or not the current action location meets a first condition indicating that the current action location should be removed from the calibration map. If the first condition is 440 met, then the current action location may be removed 442 from the calibration map and the current operational parameters may be stored 444. The autonomous navigation vehicle may drive 402 toward a next action location.

If the second condition is not 446 met, then the autonomous navigation vehicle may drive 402 toward a next action location.

If calibration is not 448 indicated, then a determination may be then made 426 to whether or not the current action location is also a waypoint location, and the process may continue as described above.

If the current action location is not 450 on the calibration map, then any actions required to be performed at the waypoint may be performed 452.

Then a determination may be made 454 to whether or not calibration-map location updates are allowed. If calibration-map location updates are not 456 allowed, then the autonomous navigation vehicle may drive 402 toward a next action location.

If a calibration-map location update is 458 allowed, then a determination may be made 460 to whether or not the current action location meets a second condition indicating that the current action location should be added to the calibration map. If the current action location meets the second condition 462, then the current action location may be added 464 to the calibration map, an overall calibration index associated with the location may be determined and stored 466, and the current operational parameters may be stored 468. The autonomous navigation vehicle may drive 402 toward a next action location.

If the current action location does not meet the second condition 470, then the autonomous navigation vehicle may drive 402 toward a next action location.

If the current action location is a calibration-map location and not a waypoint 472, then the process may jump to the determination 432 of whether or not calibration-map location updates are allowed and may proceed as described above.

Figure 5A:
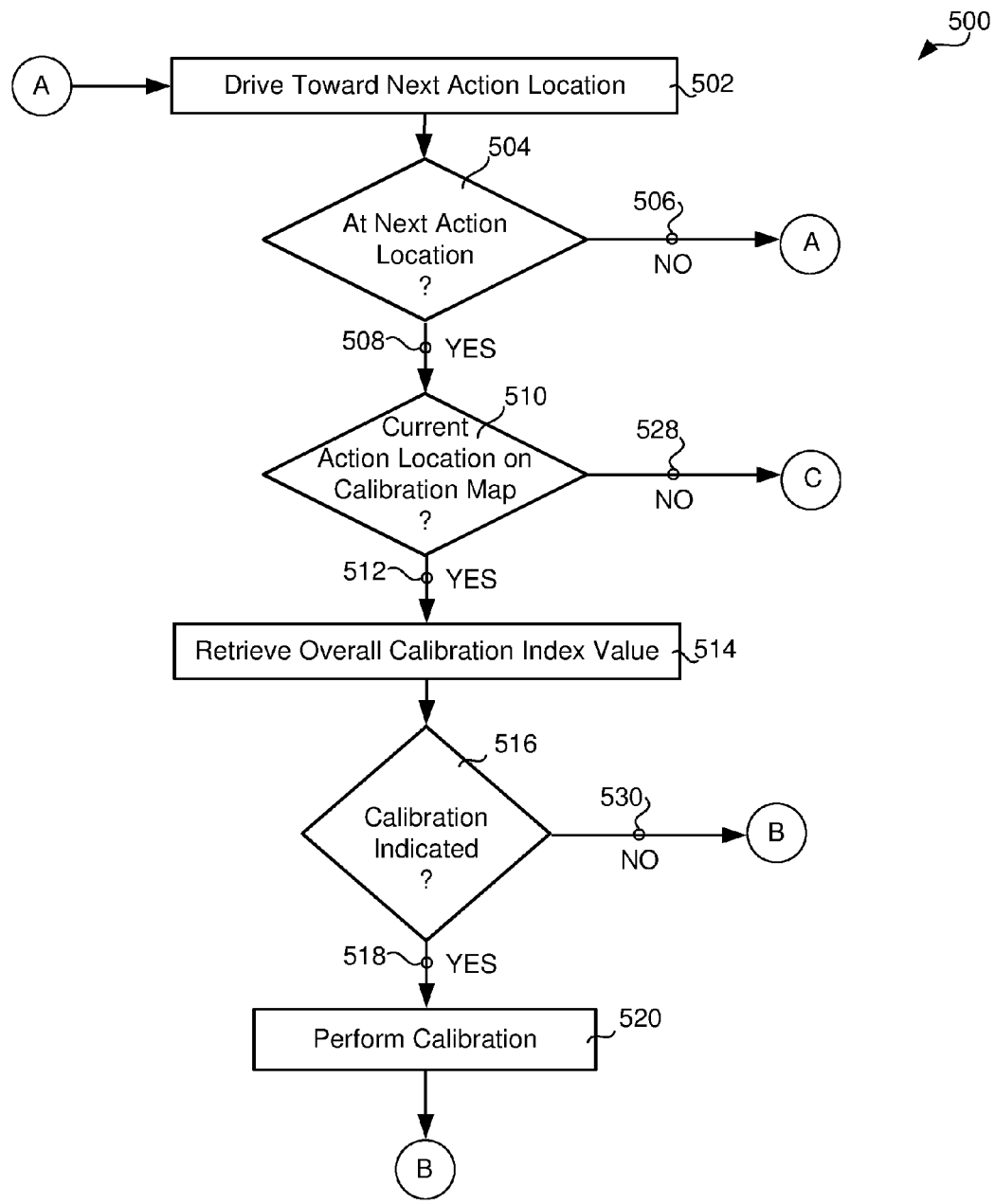
FIGS. 5A-5B are a chart showing exemplary embodiments of the present invention comprising use of a calibration map to determine when to perform a calibration procedure.
Figure 5B:
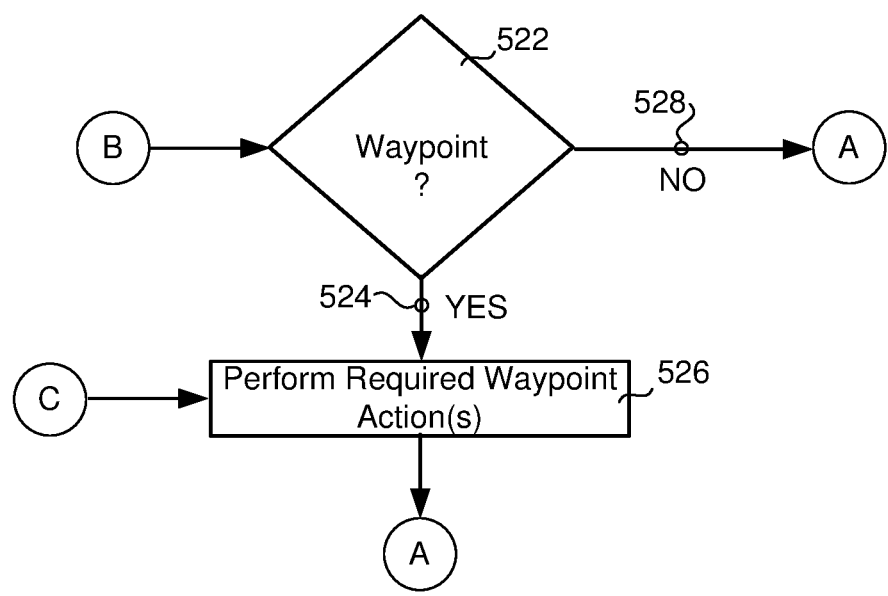
Figure 6A:
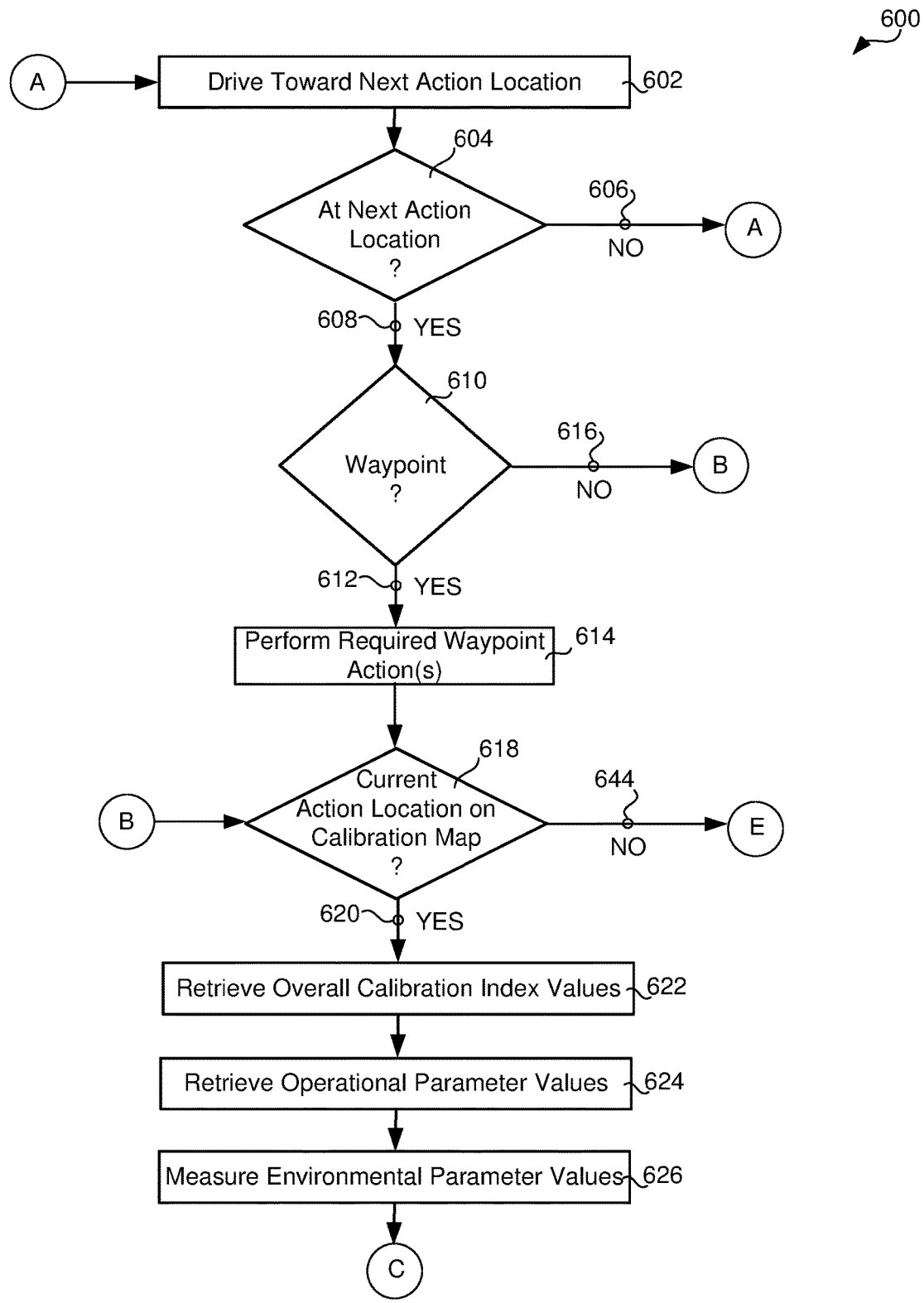
FIGS. 6A-6E are a chart showing exemplary embodiments of the present invention comprising use of a calibration map to determine when to perform a calibration procedure.
Figure 6B:
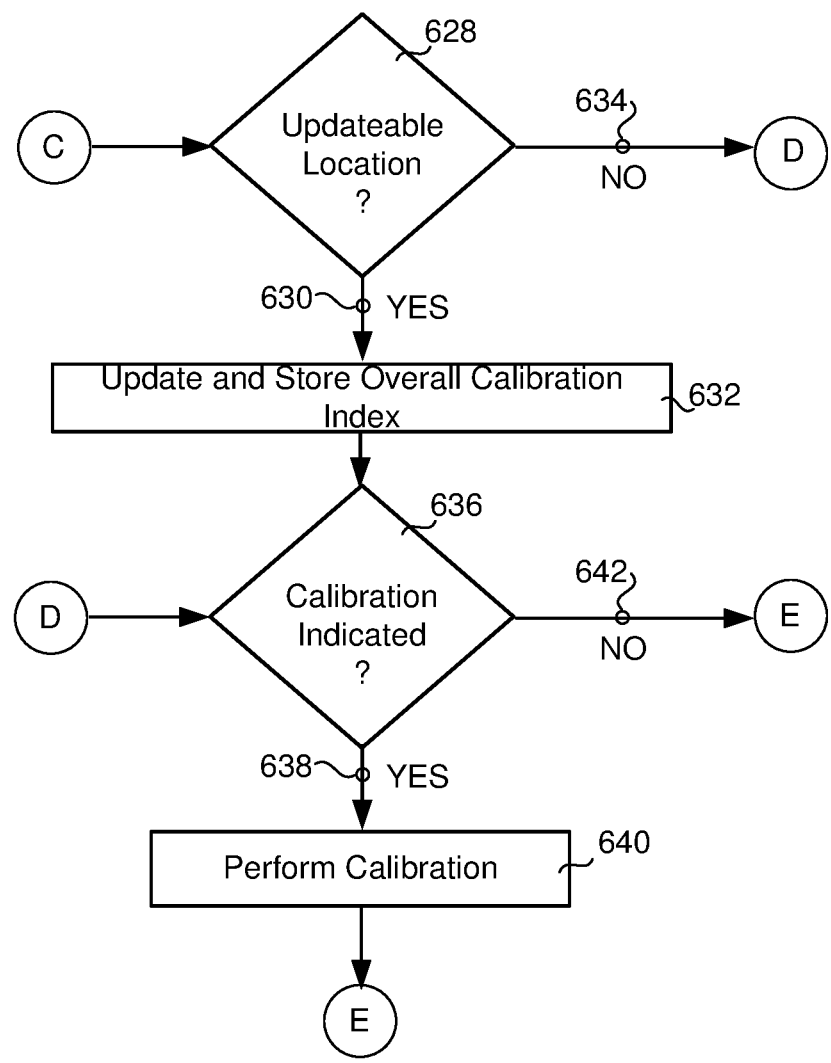
Figure 6C:
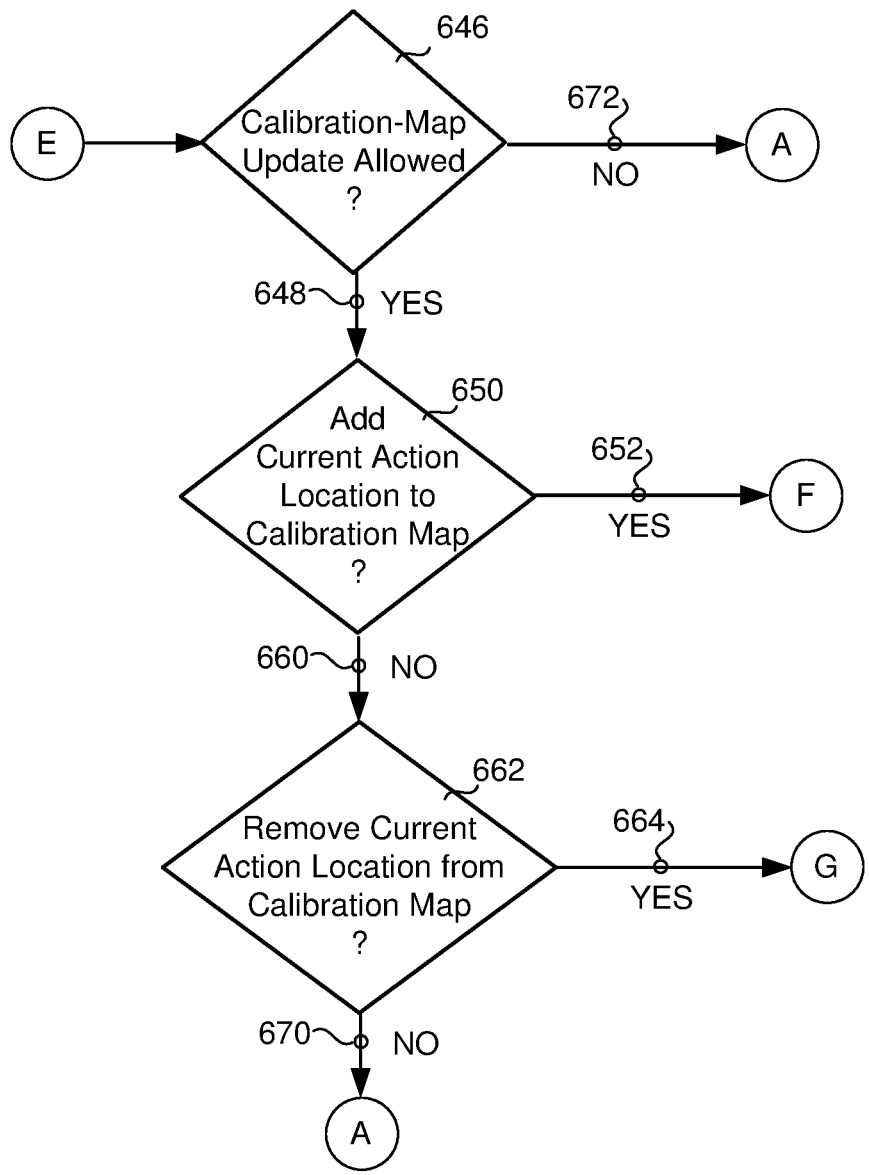
Figure 6D:
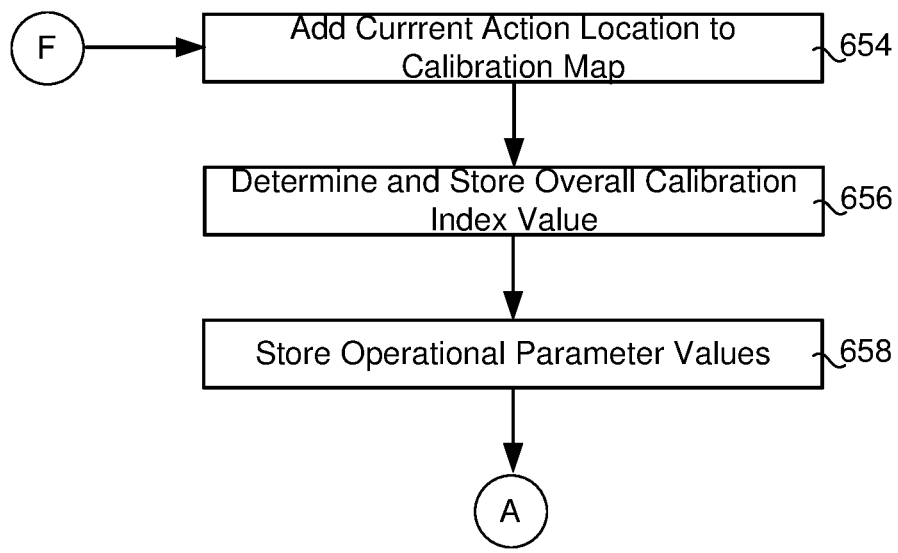
Figure 6E:
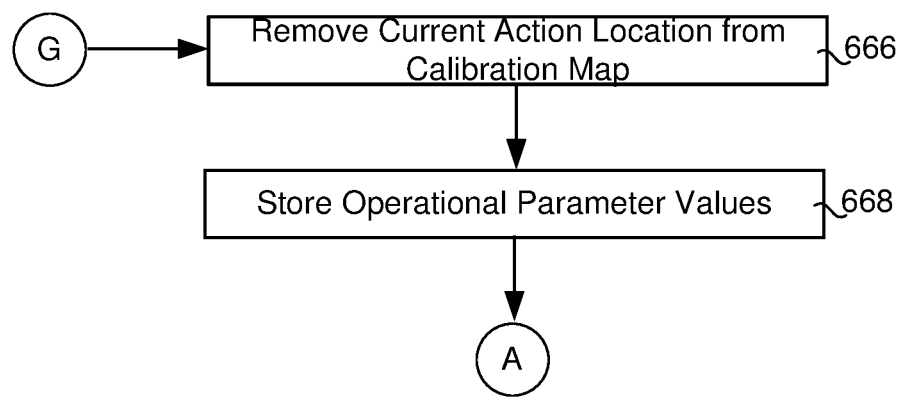

Some embodiments of the present invention comprising a method 500 for autonomous navigation calibration may be understood in relation to FIG. 5. According to some embodiments of the present invention, an autonomous navigation vehicle may drive 502 toward a next action location, wherein the next action location is a waypoint location, a calibration-map location or a co-located waypoint/calibration-map location. A determination may be made 504 to whether or not the autonomous navigation vehicle has reached the next action location.

If the autonomous navigation vehicle has not 506 reached the next action location, then the autonomous navigation vehicle may continue to drive 502 toward the next action location.

If the autonomous navigation vehicle has 508 reached the next action location, now referred to as the current action location, then a determination may be made 510 to whether or not the current action location is on a calibration map. If the current action location is 512 on the calibration map, then an overall calibration index value may be retrieved 514.

A determination may then be made 516 to whether or not calibration is indicated. If calibration is 518 indicated, then a calibration procedure may be performed 520. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

A determination may be then made 522 to whether or not the current action location is also a waypoint location. If the current action location is 524 a waypoint location, then any actions required to be performed at the waypoint may be performed 526. If the autonomous navigation vehicle remains at the terminal point of the calibration path after performing calibration, then, in order to perform any waypoint actions, the autonomous navigation vehicle may first return to the current action location. The autonomous navigation vehicle may drive 502 toward the next action location.

If the current action location is not 528 on the calibration map, then any actions required to be performed at the waypoint may be performed 526. The autonomous navigation vehicle may drive 502 toward the next action location.

If calibration is not indicated 530, then the determination 522 may be made to whether or not the current action location is a waypoint.

If the location is not 528 a waypoint, then the autonomous navigation vehicle may drive 502 toward a next action location.

Some embodiments of the present invention comprising a method 600 for autonomous navigation calibration may be understood in relation to FIG. 6. According to some embodiments of the present invention, an autonomous navigation vehicle may drive 602 toward a next action location, wherein the next action location is a waypoint location, a calibration-map location or a co-located waypoint/calibration-map location. A determination may be made 604 to whether or not the autonomous navigation vehicle has reached the next action location.

If the autonomous navigation vehicle has not 606 reached the next action location, then the autonomous navigation vehicle may continue to drive 602 toward the next action location.

If the autonomous navigation vehicle has 608 reached the next action location, now referred to as the current action location, then a determination may be made 610 to whether or not the current action location is a waypoint. If the current action location is 612 a waypoint location, then any actions required to be performed at the waypoint may be performed 614.

If the current location is not 616 a waypoint or after the actions required to be performed at the waypoint are performed, then a determination 618 may be made to determine if the current action location is on a calibration map.

If the current action location is 620 on the calibration map, then an overall calibration index value may be retrieved 622, one, or more, operational parameter values may be retrieved 624 and one, or more, environmental parameter values may be measured 626.

A determination may be made 628 to whether or not the current action location is a calibration-map location whereat the overall calibration index value may be updated. If the current action location is 630 a calibration-map location whereat the overall calibration index value may be updated, then the overall calibration index value may be updated and stored 632.

If the current action location is a calibration-map location whereat the overall calibration index value may not 634 be updated or after the overall calibration index has been updated and stored, a determination may then be made 636 to whether or not calibration is indicated. In some embodiments, calibration may be indicated when the overall calibration index value meets a first criteria. In alternative embodiments, calibration may be indicated when the overall calibration index value, the values of the operational parameters and the values of the environmental parameters meet an associated criteria. If calibration is 638 indicated, then a calibration procedure may be performed 640. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

After calibration is performed or if calibration is not 642 indicated, a determination may be made 646 to whether or not calibration-map location updates are allowed.

If a calibration-map location update is 648 allowed, then a determination may be made 650 to whether or not the current action location meets a first condition indicating that the current action location should be added to the calibration map. If the current action location meets the first condition 652, then the current action location may be added 654 to the calibration map, an overall calibration index value associated with the current action location may be determined and stored 656, and the current operational parameter values may be stored 658. The autonomous navigation vehicle may drive 602 toward a next action location.

If the current action location does not 660 meet the first condition, then a determination may be made 662 to whether or not the current action location meets a second condition indicating that the current action location should be removed from the calibration map. If the second condition is 664 met, then the current action location may be removed 666 from the calibration map and the current operational parameter values may be stored 668. The autonomous navigation vehicle may drive 602 toward a next action location.

If the second condition is not 670 met, then the autonomous navigation vehicle may drive 602 toward a next action location.

If calibration-map location updates are not 672 allowed, then the autonomous navigation vehicle may drive 602 toward a next action location.

Figure 7A:
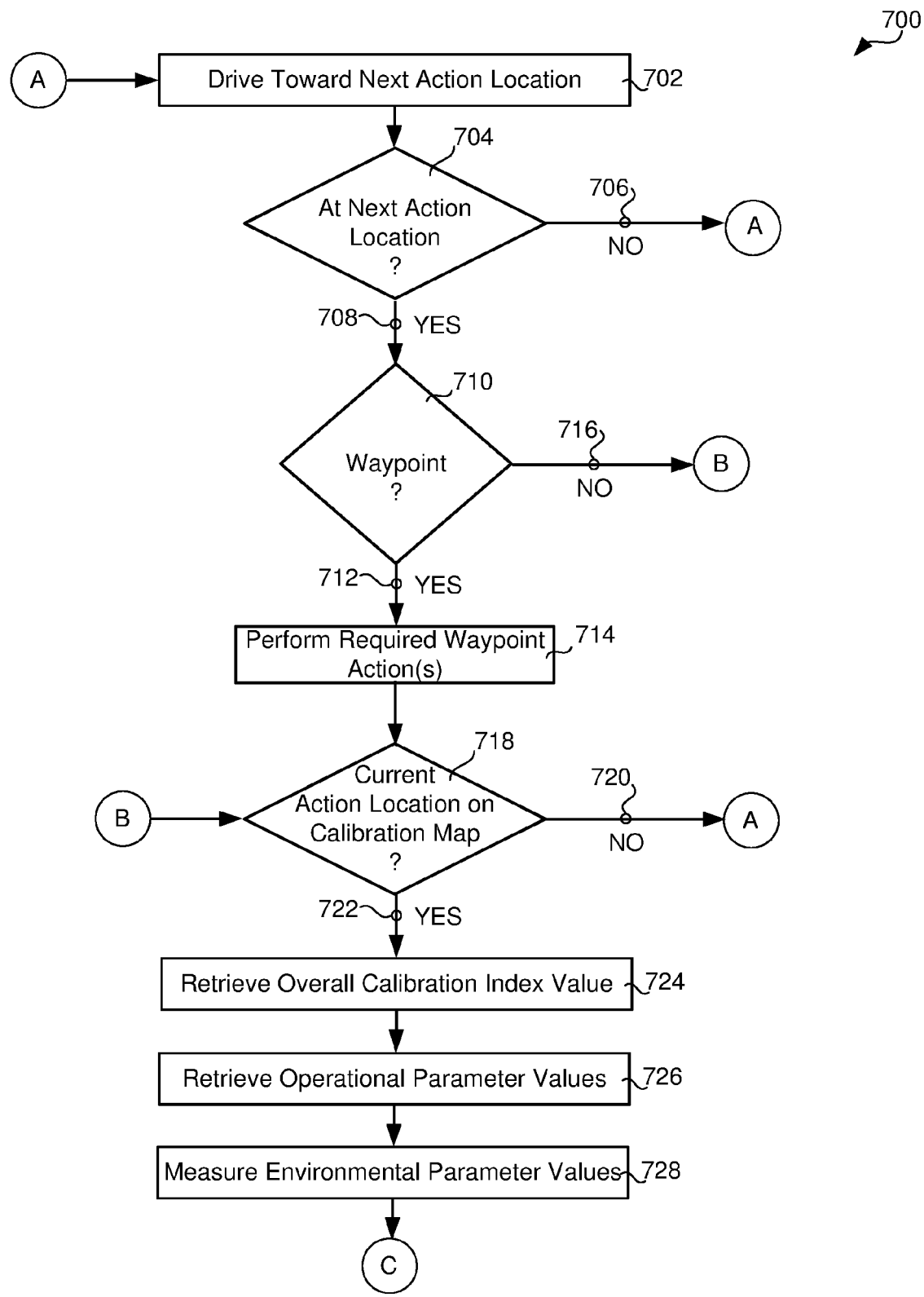
FIGS. 7A-7B are a chart showing exemplary embodiments of the present invention comprising use of a calibration map to determine when to perform a calibration procedure.
Figure 7B:
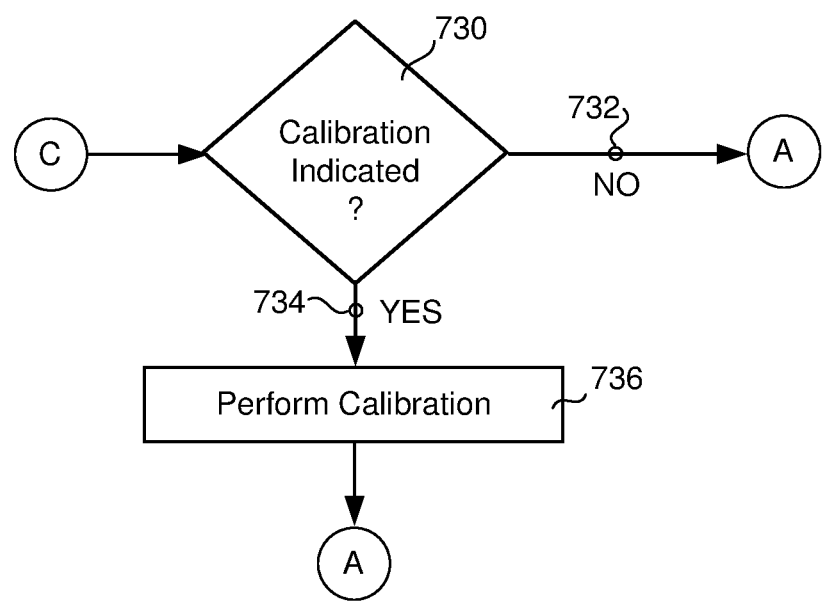

Some embodiments of the present invention comprising a method 700 for autonomous navigation calibration may be understood in relation to FIG. 7. According to some embodiments of the present invention, an autonomous navigation vehicle may drive 702 toward a next action location, wherein the next action location is a waypoint location, a calibration-map location or a co-located waypoint/calibration-map location. A determination may be made 704 to whether or not the autonomous navigation vehicle has reached the next action location.

If the autonomous navigation vehicle has not 706 reached the next action location, then the autonomous navigation vehicle may continue to drive 702 toward the next action location.

If the autonomous navigation vehicle has 708 reached the next action location, now referred to as the current action location, a determination may be then made 710 to whether or not the current action location is a waypoint location. If the current action location is 712 a waypoint location, then any actions required to be performed at the waypoint may be performed 714.

After the waypoint actions are performed or if the current location is not 716 a waypoint, then a determination may be made 718 to whether or not the current action location is on a calibration map. If the current action location is not 720 on a calibration map, then the autonomous navigation vehicle may drive 702 toward the next action location. If the current action location is 722 on the calibration map, then an overall calibration index value may be retrieved 724, one, or more, operational parameter values may be retrieved 726 and one, or more, environmental parameter values may be measured 728.

A determination may then be made 730 to whether or not calibration is indicated. If calibration is not 732 indicated, then the autonomous navigation vehicle may continue to drive 702 toward the next action location. If calibration is 734 indicated, then a calibration procedure may be performed 736. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

The autonomous navigation vehicle may drive 302 toward the next action location.

Figure 8A:
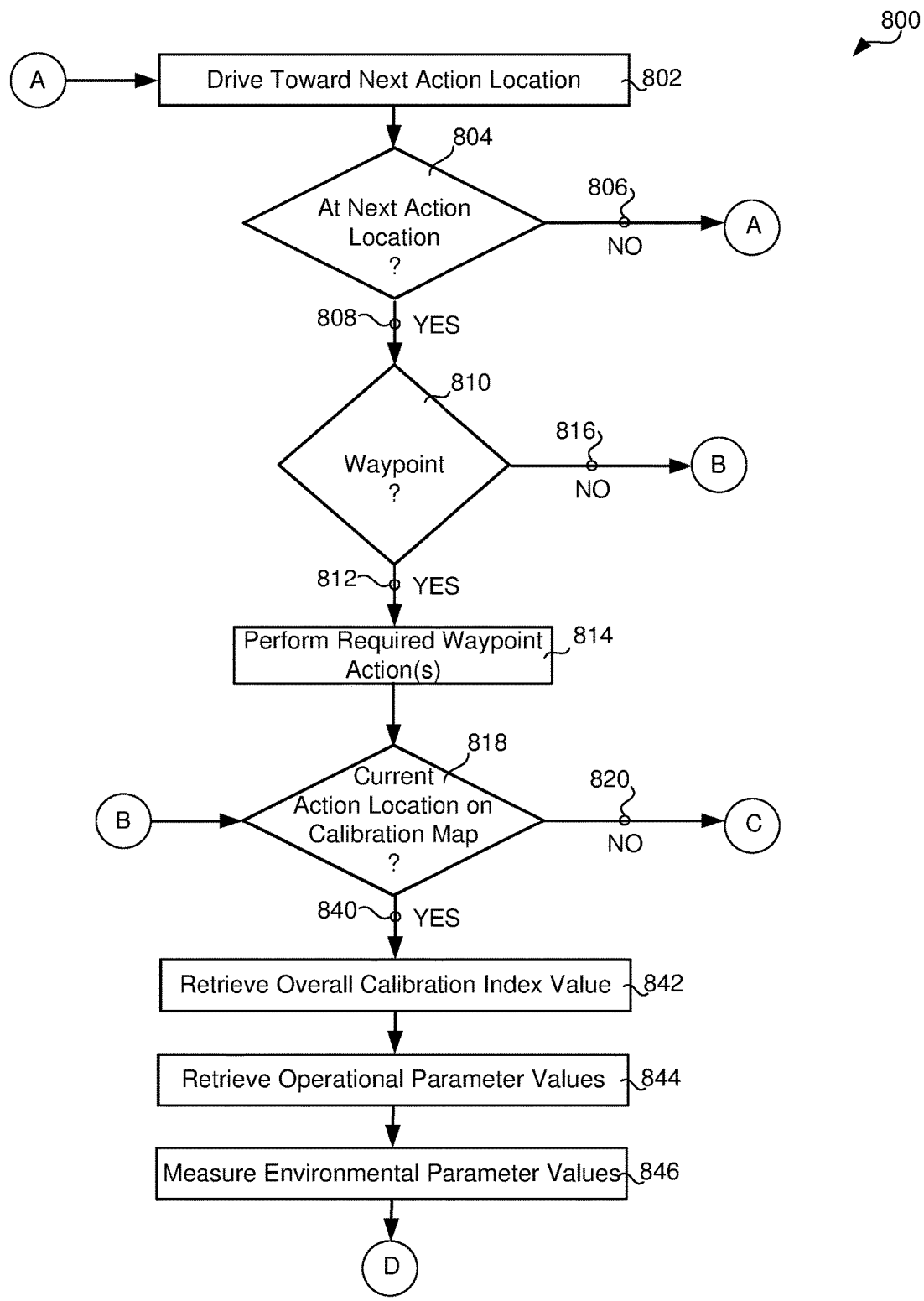
FIGS. 8A-8C are a chart showing exemplary embodiments of the present invention comprising use of a calibration map to determine when to perform a calibration procedure.
Figure 8B:
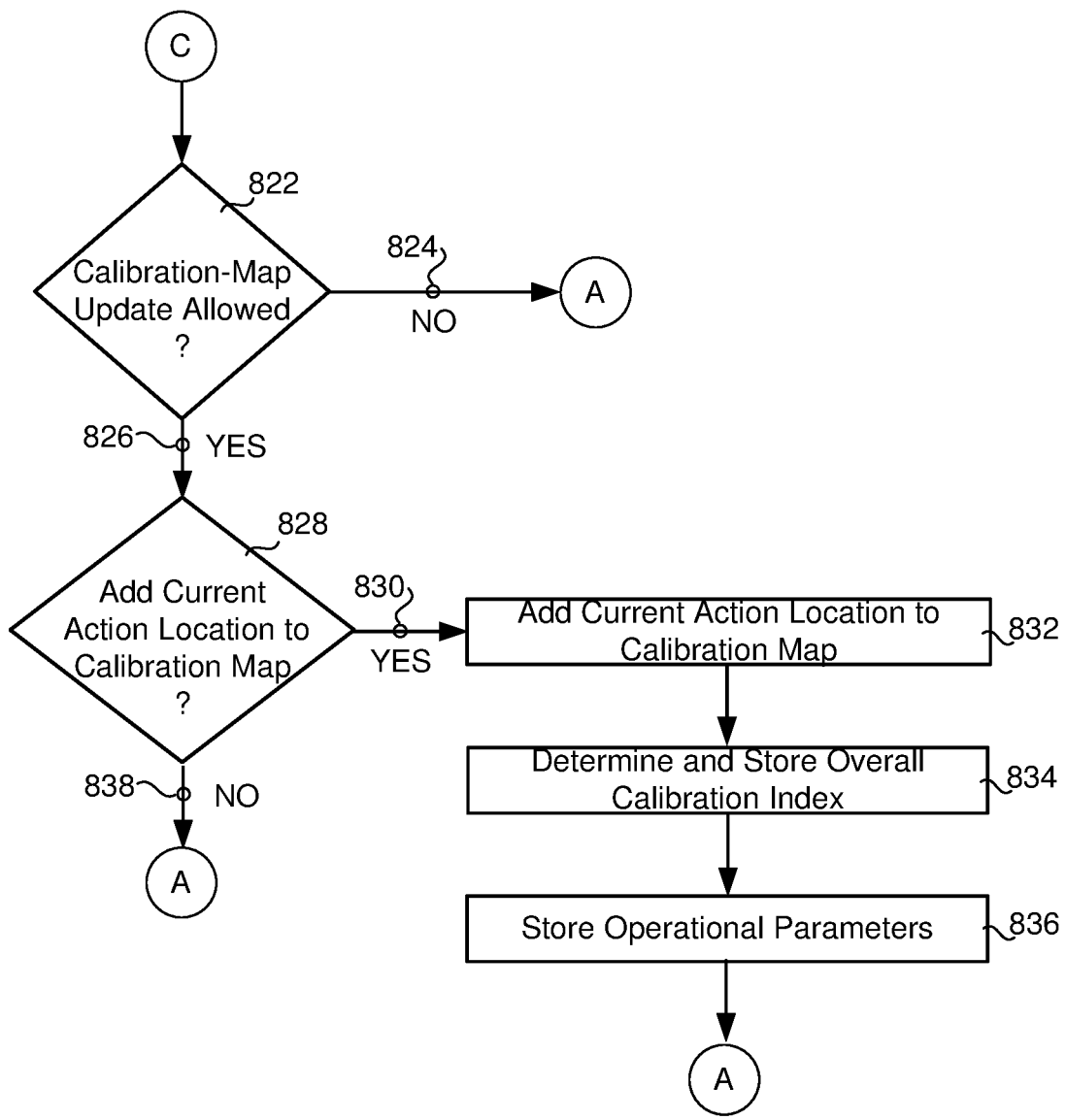
Figure 8C:
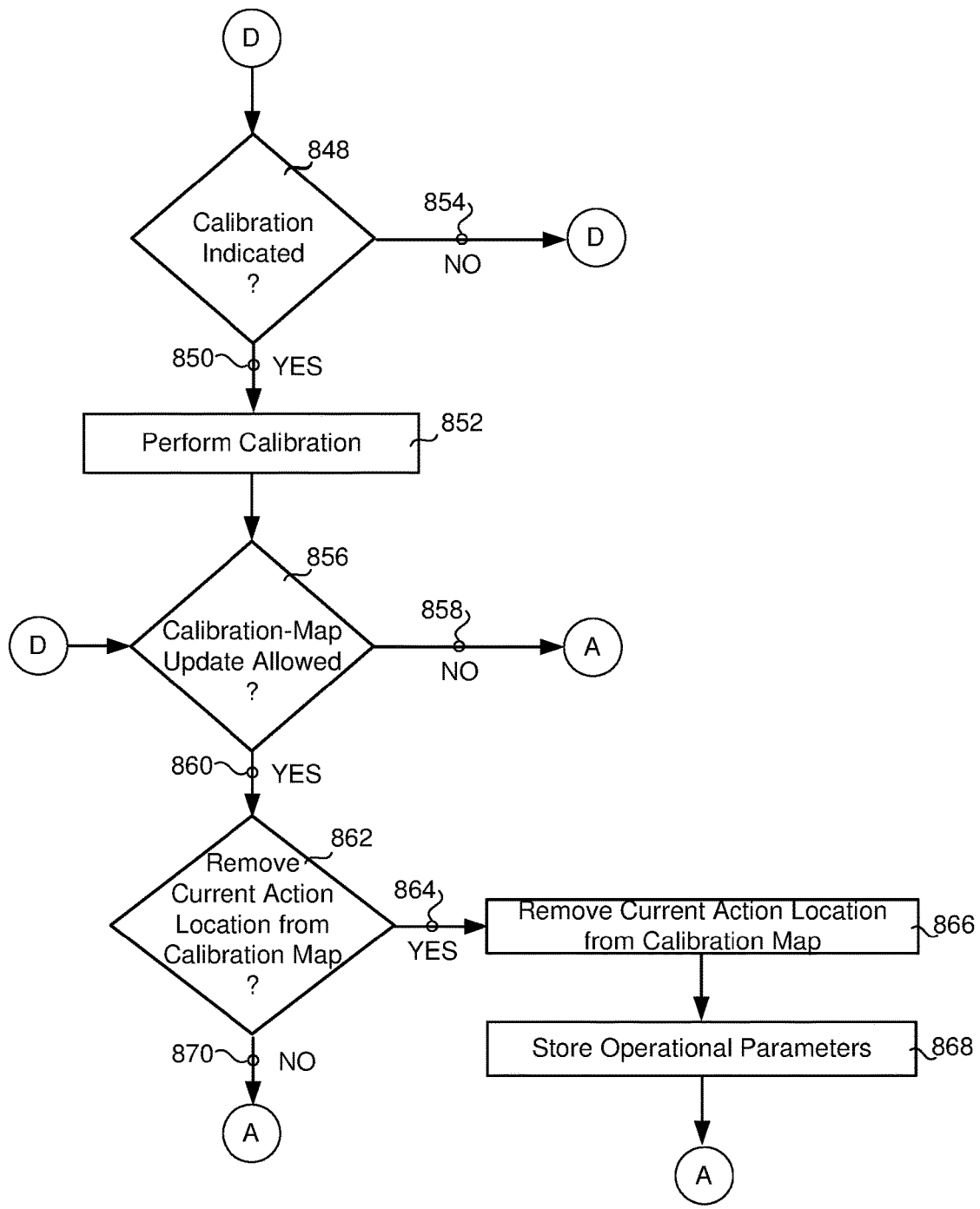

Some embodiments of the present invention comprising a method 800 for autonomous navigation calibration may be understood in relation to FIG. 8. According to some embodiments of the present invention, an autonomous navigation vehicle may drive 802 toward a next action location, wherein the next action location is a waypoint location, a calibration-map location or a co-located waypoint/calibration-map location. A determination may be made 804 to whether or not the autonomous navigation vehicle has reached the next action location.

If the autonomous navigation vehicle has not 806 reached the next action location, then the autonomous navigation vehicle may continue to drive 802 toward the next action location.

If the autonomous navigation vehicle has 808 reached the next action location, now referred to as the current action location, then a determination may be made 810 to whether or not the current action location is a waypoint location. If the current action location is 812 a waypoint location, then any actions required to be performed at the waypoint may be performed 814.

If the current action location is not 816 a waypoint or after any waypoint actions are performed, a determination 818 may be made to whether or not the current action location is on a calibration map. If the current action location is not 820 on the calibration map, then a determination may be made 822 to whether or not calibration-map location updates are allowed. If calibration-map location updates are not 824 allowed, then the autonomous navigation vehicle may drive 802 toward a next action location.

If a calibration-map location update is 826 allowed, then a determination may be made 828 to whether or not the current action location meets a first condition indicating that the current action location should be added to the calibration map. If the current action location meets the first condition 830, then the current action location may be added 832 to the calibration map, an overall calibration index associated with the location may be determined and stored 834, and the current operational parameters may be stored 836. The autonomous navigation vehicle may drive 802 toward a next action location.

If the first condition is not 838 met, then the autonomous navigation vehicle may drive 802 toward a next action location.

If the current action location is 840 on the calibration map, then an overall calibration index value may be retrieved 842, one, or more, operational parameter values may be retrieved 844 and one, or more, environmental parameter values may be measured 846.

A determination may then be made 848 to whether or not calibration is indicated. If calibration is 850 indicated, then a calibration procedure may be performed 852. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

If calibration is not 854 indicated or after calibration is performed, a determination may be made 856 to whether or not calibration-map location updates are allowed. If calibration-map location updates are not 858 allowed, then the autonomous navigation vehicle may drive 802 toward a next action location.

If a calibration-map location update is 860 allowed, then a determination may be made 862 to whether or not the current action location meets a second condition indicating that the current action location should be removed the calibration map. If the current action location meets the second condition 864, then the current action location may be removed 866 from the calibration map, the operational parameters may be stored 868 and the autonomous navigation vehicle may drive 802 toard a next action location, If the current action location does not 870 meet the second condition, then the autonomous navigation vehicle may drive 802 toward a next action location.

Figure 9A:
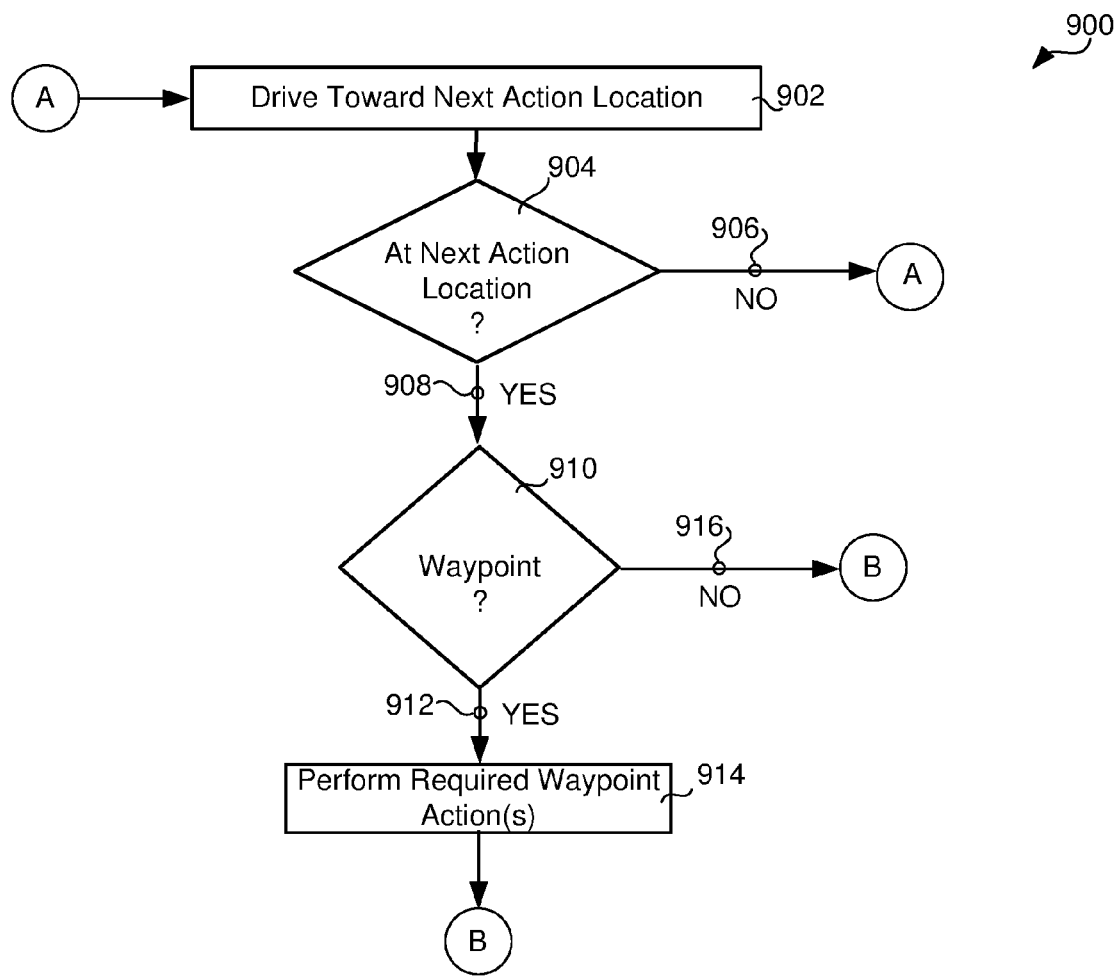
FIGS. 9A-B are a chart showing exemplary embodiments of the present invention comprising use of a calibration map to determine when to perform a calibration procedure.
Figure 9B:
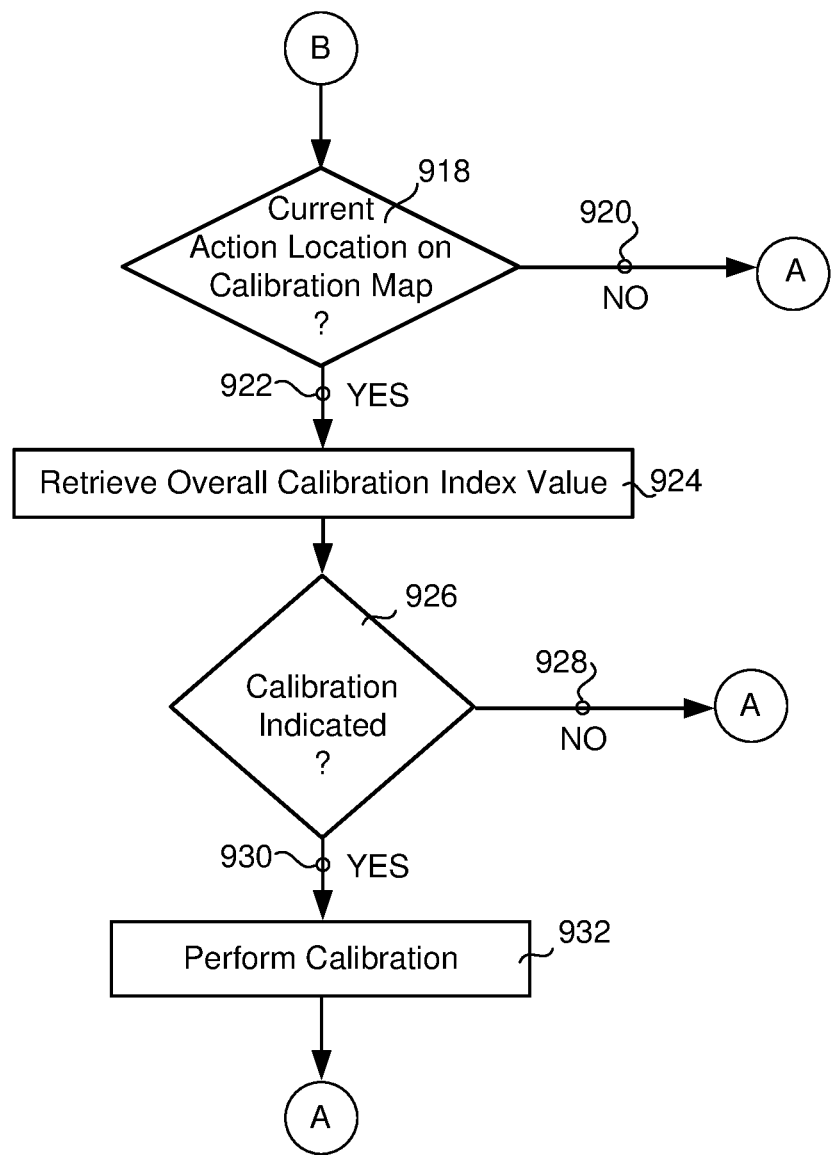

Some embodiments of the present invention comprising a method 900 for autonomous navigation calibration may be understood in relation to FIG. 9. According to some embodiments of the present invention, an autonomous navigation vehicle may drive 902 toward a next action location, wherein the next action location is a waypoint location, a calibration-map location or a co-located waypoint/calibration-map location. A determination may be made 904 to whether or not the autonomous navigation vehicle has reached the next action location.

If the autonomous navigation vehicle has not 906 reached the next action location, then the autonomous navigation vehicle may continue to drive 902 toward the next action location.

If the autonomous navigation vehicle has 908 reached the next action location, now referred to as the current action location, then a determination may be made 910 to whether or not the current action location is a waypoint. If the current action location is 912 a waypoint location, then any actions required to be performed at the waypoint may be performed 914.

After the waypoint actions are performed or if the current location is not 916 a waypoint, a determination 918 may be made to determine whether, or not, the current action location is on a calibration map.

If the current action location is not 920 on the calibration map, then the autonomous navigation vehicle may drive 902 toward the next action location. If the current action location is 922 on the calibration map, then an overall calibration index value may be retrieved 924.

A determination may then be made 926 to whether or not calibration is indicated. If calibration is not 928 indicated, then autonomous navigation vehicle may drive 902 toward the next action location. If calibration is 930 indicated, then a calibration procedure may be performed 932. In some embodiments of the present invention, the calibration procedure may comprise moving the autonomous navigation vehicle along a known path. In some of these embodiments, after the calibration procedure, the autonomous navigation vehicle may return to the current action location. In other of these embodiments, after the calibration procedure, the autonomous navigation vehicle may remain at the terminal point of the calibration path.

The autonomous navigation vehicle may drive 902 toward the next action location.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMs), Electrically Erasable Programmable Read-Only Memory (EEPROMs), Random-Access Memory (RAMs), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for calibrating an autonomous navigation vehicle, said method comprising:
   determining that a first location of an autonomous navigation vehicle is a calibration-map location;
   retrieving a value of an overall calibration index associated with said first location, wherein said overall calibration index includes a first specific calibration index related to an availability of an absolute positioning system at said first location;
   determining, using said overall calibration index value, if said first location is a suitable location for performing a calibration operation; and
   when said first location is a suitable location for performing a calibration operation, performing said calibration operation.

2. A method as described in claim 1, wherein said overall calibration index value is a combination of a plurality of specific calibration values associated with a plurality of specific calibration indices, including said first specific calibration index.

3. A method as described in claim 1, wherein said first specific calibration index is a binary index.

4. A method as described in claim 1, wherein said first specific calibration index is a multi-valued index.

5. A method as described in claim 2, wherein said plurality of specific calibration indices comprises a second specific calibration index related to an availability of an adequate calibration path at said first location.

6. A method as described in claim 5, wherein said second specific calibration index is a binary index.

7. A method as described in claim 5, wherein said second calibration index is a multi-valued index.

8. A method as described in claim 2, wherein said plurality of specific calibration indices comprises a third specific calibration index related to a first environment condition at said first location.

9. A method as described in claim 8, wherein said first environment condition is an environment condition selected from the group consisting of a meteorological condition and a terrain condition.

10. A method as described in claim 1 further comprising updating said overall calibration index value and storing said updated overall calibration index value.

11. A method as described in claim 1 further comprising removing said first location from a plurality of calibration-map locations based on a factor selected from the group consisting of an environment factor, an operational factor and a temporal history of calibration operations.

12. A method as described in claim 1 further comprising adding a second location to a plurality of calibration-map locations based on a factor selected from the group consisting of an environment factor, an operation factor and a temporal history of calibration operations.

13. A method as described in claim 1 further comprising:
retrieving a first operational-parameter value;
measuring a first environmental-parameter value; and
wherein said determining if said first location is a suitable location for performing a calibration operation uses said first operational-parameter value and said first environmental-parameter value.

14. A method as described in claim 1 further comprising:
determining if said first location is a waypoint location; and
when said first location is a waypoint location, performing a waypoint operation.

15. A method as described in claim 1 further comprising generating a calibration map.

16. A method for generating a calibration map, said method comprising:
identifying a plurality of calibration-map locations;
assigning an overall-calibration-index value to each calibration-map location in said plurality of calibration-map locations: and
identifying a first calibration-map location in said plurality of calibration-map locations, wherein identifying said first calibration-map location comprises determining an availability of an absolute positioning system at a first candidate location.

17. A method as described in claim 16, wherein identifying a first calibration-map location in said plurality of calibration-map locations comprises identifying a suitable calibration path at a first candidate location.

18. A method as described in claim 16, wherein said assigning an overall-calibration-index value to a first calibration-map location comprises combining a plurality of specific-calibration-index values.

* * * * *